(12) United States Patent
Karasudani et al.

(10) Patent No.: US 11,138,759 B2
(45) Date of Patent: Oct. 5, 2021

(54) IMAGE PROCESSING APPARATUS AND IMAGE PROCESSING METHOD

(71) Applicant: FUJITSU LIMITED, Kawasaki (JP)

(72) Inventors: Ayu Karasudani, Yamato (JP); Atsunori Moteki, Inagi (JP); Kensuke Kuraki, Ichikawa (JP); Toshiyuki Yoshitake, Kawasaki (JP); Mitsuhiro Makita, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 112 days.

(21) Appl. No.: 16/708,951

(22) Filed: Dec. 10, 2019

(65) Prior Publication Data
US 2020/0193637 A1 Jun. 18, 2020

(30) Foreign Application Priority Data

Dec. 13, 2018 (JP) .............................. JP2018-233684
Oct. 24, 2019 (JP) .............................. JP2019-193142

(51) Int. Cl.
*G06T 7/73* (2017.01)
*G06T 7/543* (2017.01)
(Continued)

(52) U.S. Cl.
CPC ............... *G06T 7/75* (2017.01); *G06T 7/543* (2017.01); *G06T 7/74* (2017.01); *G06T 11/203* (2013.01)

(58) Field of Classification Search
CPC ............ G06T 7/70; G06T 2207/30004; G06K 9/00208; G06K 9/46
See application file for complete search history.

(56) References Cited

U.S. PATENT DOCUMENTS 7,298,923 B2 * 11/2007 Zhang .................. G06K 9/6203
345/639
8,306,260 B2 * 11/2012 Zhu ........................ G06K 9/209
382/103

(Continued)

FOREIGN PATENT DOCUMENTS

JP 2013-149042 A 8/2013
JP 2014-091078 A 5/2017
(Continued)

OTHER PUBLICATIONS

Rakesh Kumar et al., "Robust Methods for Estimating Pose and a Sensitivity Analysis", CVGIP: Image Understanding vol. 60, No. 3, Nov. 1994, pp. 313-342 (30 pages).

(Continued)

*Primary Examiner* — Yosef Kassa
(74) *Attorney, Agent, or Firm* — Fujitsu Patent Center

(57) ABSTRACT

A processor detects feature lines from an image of an object and generates projection lines by projecting line segments in shape information of the object on the image. The processor generates combinations each including a feature line and a projection line and generates plural sets each including a specific number of combinations. The processor uses each set to estimate a position and an orientation of an imaging device that has captured the image, and evaluates a result of the estimation for each set. When there is a change in a relative position or orientation between the object on the image and a shape represented by the shape information, the processor repeats generation of the plural sets, estimation of the position and the orientation of the imaging device and evaluation of the estimation result. The processor determines the position and the orientation of the imaging device based on the repeated evaluation.

20 Claims, 33 Drawing Sheets

(51) Int. Cl.
*G06T 11/20* (2006.01)
*G06T 1/20* (2006.01)

(56) References Cited

U.S. PATENT DOCUMENTS

| | | | | |
|---|---|---|---|---|
| 8,417,060 | B2* | 4/2013 | Abousleman | G06K 9/4671 |
| | | | | 382/284 |
| 8,682,106 | B2* | 3/2014 | Kotake | G06K 9/32 |
| | | | | 382/285 |
| 9,091,528 | B2* | 7/2015 | Brooksby | G01N 21/9515 |
| 9,530,212 | B2* | 12/2016 | Han | G06T 5/002 |
| 9,747,680 | B2* | 8/2017 | Tai | G06T 19/20 |
| 2017/0132752 | A1 | 5/2017 | Aoyagi et al. | |

FOREIGN PATENT DOCUMENTS

| | | |
|---|---|---|
| JP | 2018-067188 A | 4/2018 |
| JP | 2018-073095 A | 5/2018 |

OTHER PUBLICATIONS

Jim Z. C. Lai, "Sensitivity Analysis of Line Correspondence", IEEE Transactions on Systems, Man, and Cybernetics, vol. 25, No. 6, Jun. 1995, pp. 1016-1023 (8 pages).

\* cited by examiner

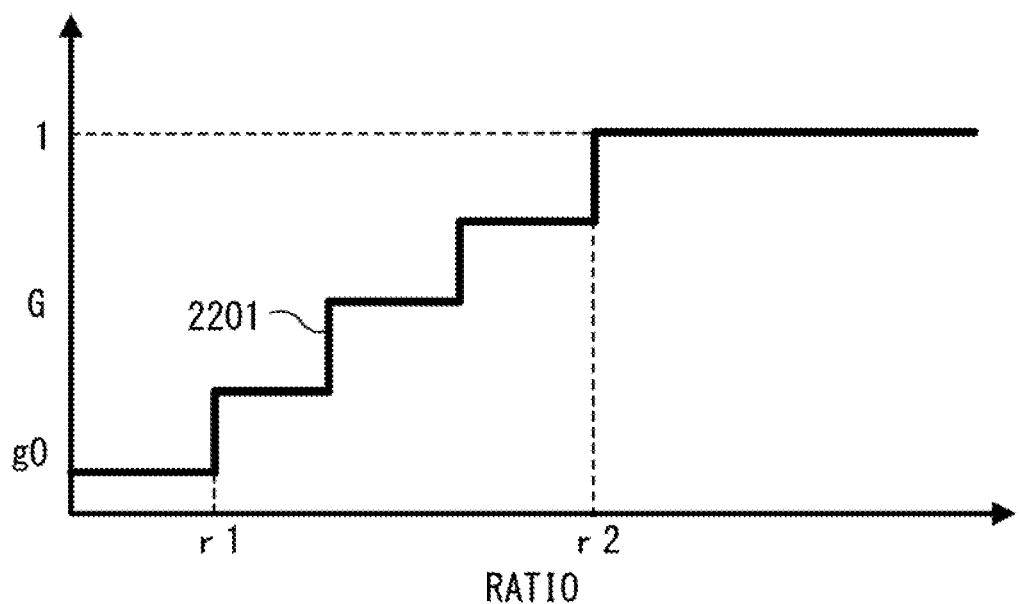
F I G. 2 2

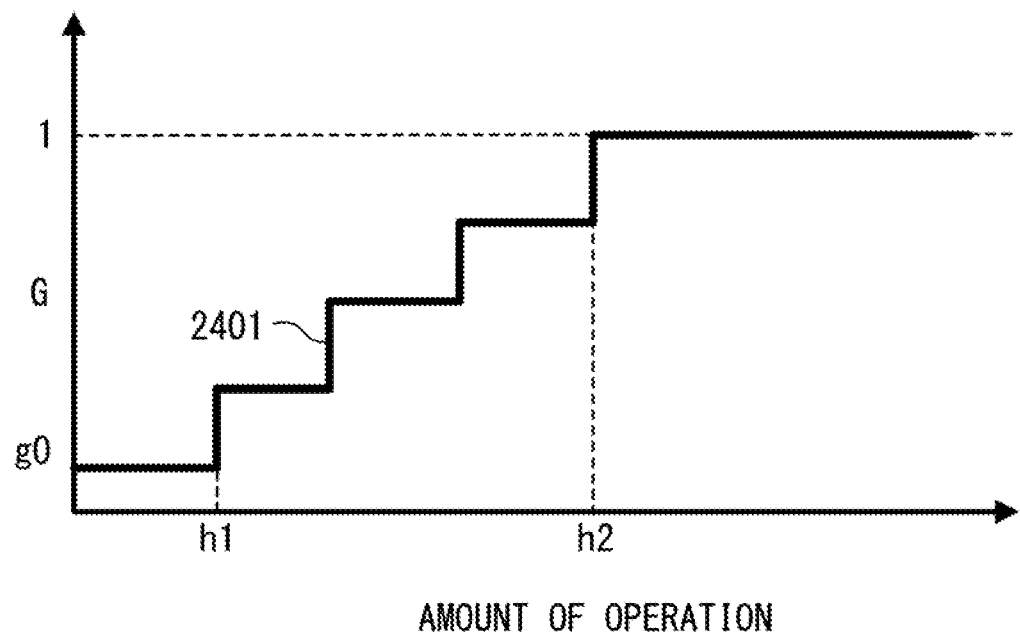
F I G. 24

IMAGE PROCESSING APPARATUS AND IMAGE PROCESSING METHOD

CROSS-REFERENCE TO RELATED APPLICATIONS

This application is based upon and claims the benefit of priority of the prior Japanese Patent Application No. 2018-233684, filed on Dec. 13, 2018, and the prior Japanese Patent Application No. 2019-193142, filed on Oct. 24, 2019, the entire contents of which are incorporated herein by reference.

FIELD

The embodiments discussed herein relate to an image processing apparatus and an image processing method.

BACKGROUND

Systems that display images by using augmented reality (AR) technology have been in widespread use in recent years. In an example of augmented reality technology, an image of an object is captured by using a camera mounted on a personal computer (PC), a mobile terminal device, and the like, and a position and an orientation of the camera in a 3-dimensional space are estimated from the image of the object. Based on the determined position and orientation of the camera, contents information is superimposed on any position in the image.

As an application of AR technology, a technology of superimposing computer-aided design (CAD) data representing a 3D shape of an object on an image has been known (see Patent Document 1 and Patent Document 2 for example). A technology that determines a position and an orientation of a camera or an object based on correspondence of lines has also been known (see Non-patent Document 1 and Non-patent Document 2 for example).

Patent Document 1: Japanese Laid-open Patent Publication No. 2017-91078
Patent Document 2: Japanese Laid-open Patent Publication No. 2018-67188
Non-patent Document 1: R. Kumar et al., "Robust Methods for Estimating Pose and a Sensitivity Analysis", CVGIP: Image Understanding Volume 60, Issue 3, pages 313-342, November 1994
Non-patent Document 2: J. Z. C. Lai, "Sensitivity Analysis of Line Correspondence", IEEE Transactions on Systems, Man, and Cybernetics VOL. 25, NO. 6, pages 1016-1023, 1995

SUMMARY

According to an aspect of the embodiments, the image processing apparatus includes a memory and a processor coupled to the memory.

The memory stores shape information including plural line segments representing a shape of an object. The processor detects plural feature lines from a obtained image of the object and generates plural projection lines by projecting plural line segments included in the shape information on the image.

The processor, next, selects a feature line from among the plural feature lines, selects a projection line from among the plural projection lines, and generates combinations each including the feature line and the projection line by associating the selected feature line and the selected projection line. The processor generates plural sets each including a specific number of the combinations.

The processor uses each of the plural sets to estimate a position and an orientation in a three-dimensional space of an imaging device that has captured an image of the object, and evaluates an estimation result of the position and the orientation of the imaging device for each of the plural sets.

When there is a change in a relative position or orientation between the object on the image captured by the imaging device and the shape represented by the shape information, the processor repeats generation of the plural sets, repeats estimation of the position and the orientation of the imaging device and repeats evaluation of the estimation result. The processor determines the position and the orientation of the imaging device based on a result of the repeated evaluation of the estimation result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 22 is a diagram illustrating the second sensitivity adjustment method;

FIG. 24 is a diagram illustrating the fourth sensitivity adjustment method;

DESCRIPTION OF EMBODIMENTS

Figure 1:
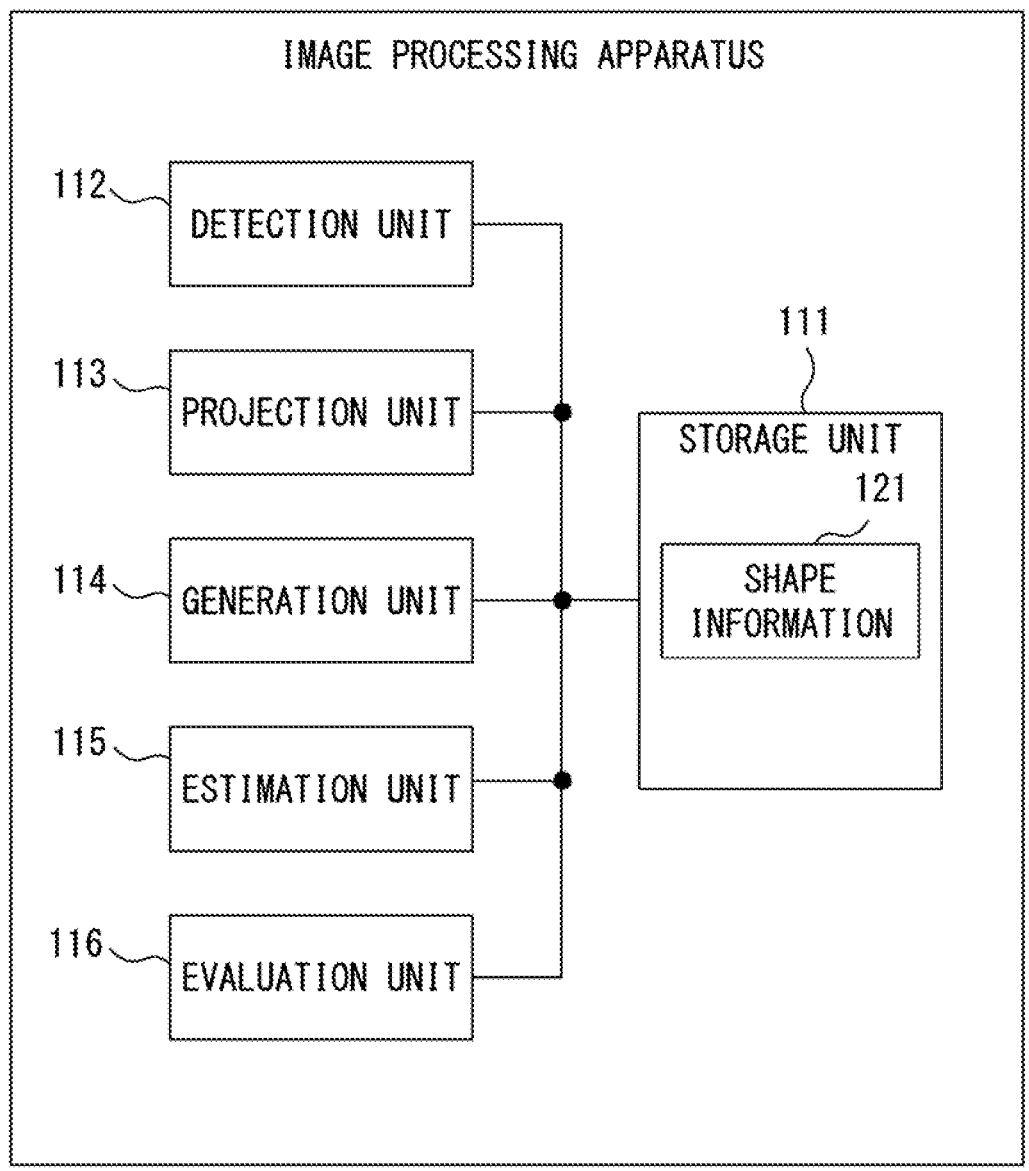
FIG. 1 is a diagram of a functional configuration of an image processing apparatus.

In the following descriptions, details of the embodiments are explained with reference to the drawings.

A position and an orientation of a camera can be estimated by associating plural feature lines detected from an image of an object with plural projection lines obtained by projecting, on the image, plural line segments included in CAD data of the object.

In the technology disclosed in Patent Document 1, an image is superimposed on a model image by using a combination of an edge line extracted from the image captured from a three-dimensional structure and a ridge line included in the model image of the three-dimensional structure. The model image is generated by projecting CAD data of the three-dimensional structure on the captured image and the ridge line corresponds to a projection line that is generated by projecting a line segment in the CAD data on the captured image.

In this case, an edge line and a ridge line that a user selects are line segments, which have better visibility than dots. For that reason, an operation to select an edge line and a ridge line by using a mouse and the like is easier than an operation to select a dot and a workload of a user can be reduced. However, Patent Document 1 does not disclose any method of selecting an appropriate combination of an edge line and a ridge line.

When a user visually and manually selects a combination (an associated pair) of a feature line detected from an image of an object and a projection line obtained by projecting a line included in CAD data of the object as in Patent Document 1, the following problem may occur.

For an unskilled user, an operation of rotating a model in an appropriate orientation on a screen displaying an image of an object and the model of the object represented by CAD data and an operation of selecting an appropriate combination of a feature line and a projection line are difficult. For example, in order to improve an accuracy of estimation of a position and an orientation of a camera, it is desirable that three parallel feature lines or three parallel projection lines are not included in plural selected feature lines or plural selected projection lines. It takes time for such an unskilled user to select an appropriate combination of a feature line and a projection line, and an erroneous combination of a feature line and a projection line may be selected.

Meanwhile, it is possible to estimate a position and an orientation of a camera by selecting combinations of plural feature lines and plural projection lines at random, instead of a user selecting an associated pair, and to determine a combination that has the minimum estimation error. In this case, however, processing of estimating a position and an orientation of a camera is repeated over and over while changing combinations of plural feature lines and plural projection lines, and it will take a long time to calculate. When an object has a complex shape, the calculation time becomes even longer.

Note that the above problems may occur not only when a position and an orientation of a camera are estimated from CAD data but also when a position and an orientation of a camera are estimated from other shape information representing a shape of an object.

FIG. 1 illustrates an example of a functional configuration of an image processing apparatus according to the embodiments. The image processing apparatus 101 in FIG. 1 includes a storage unit 111, a detection unit 112, a projection unit 113, a generation unit 114, an estimation unit 115, and an evaluation unit 116. The storage unit 111 stores shape information 121 including plural line segments representing a shape of an object. The detection unit 112, the projection unit 113, the generation unit 114, the estimation unit 115, and the evaluation unit 116 carry out image processing by using the shape information 121 stored in the storage unit 111.

Figure 2:
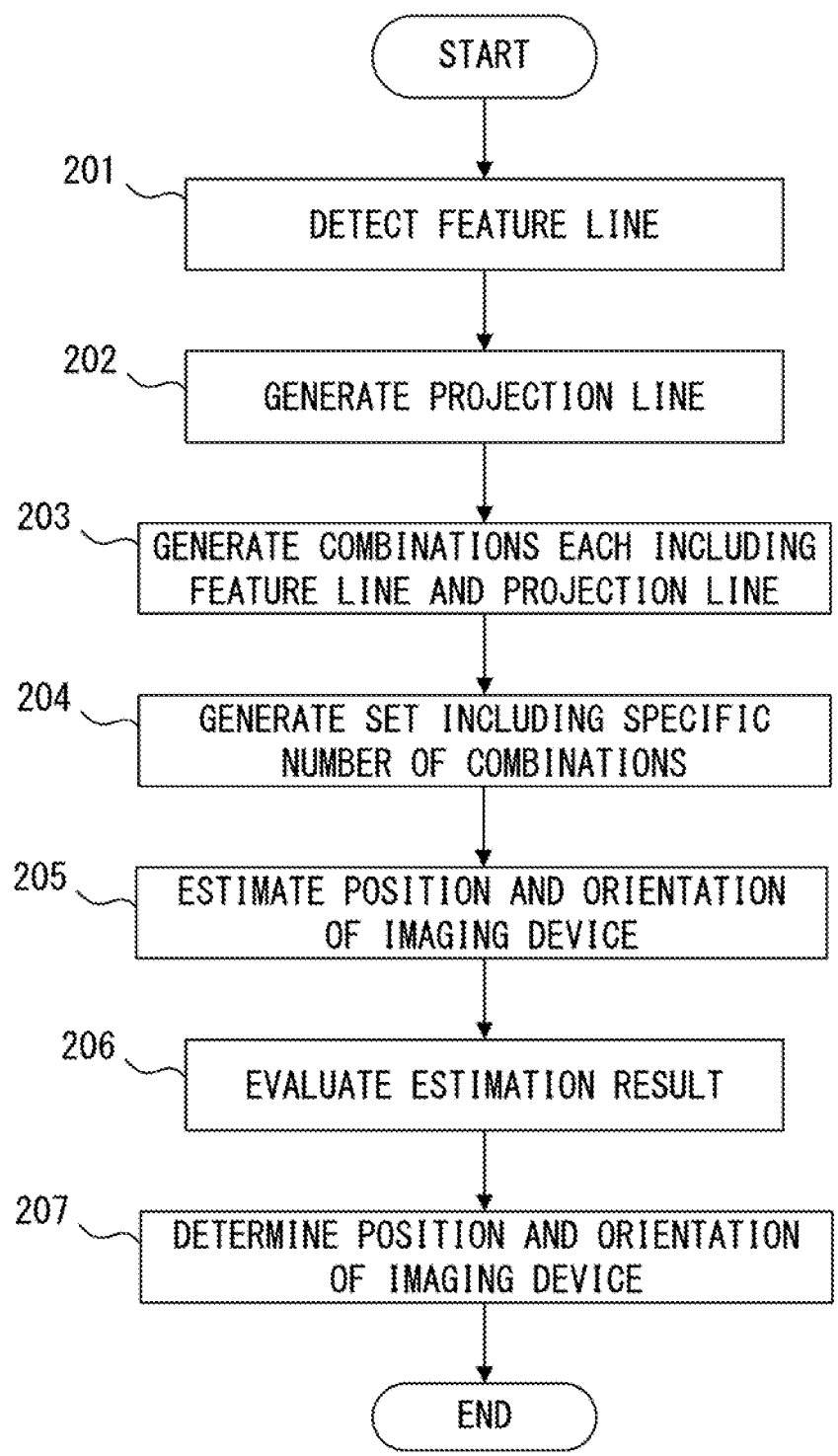
FIG. 2 is a flowchart of image processing.

FIG. 2 is a flowchart of an example of the image processing carried out by the image processing apparatus 101 in FIG. 1. The detection unit 112, first, detects plural feature lines from an obtained image of the object (step 201), and the projection unit 113 generates plural projection lines by projecting plural line segments included in shape information on the image (step 202).

Next, the generation unit 114 selects any feature line from among the plural feature lines, also selects any projection line from among the plural projection lines and generates combinations each including a feature line and a projection line by associating the selected feature line with the selected projection line (step 203). The generation unit 114 then generates plural sets, each including a specific number of the combinations (step 204).

Next, the estimation unit 115 estimates a position and an orientation of an imaging device that has captured the image of the object in a three-dimensional space by using each of the plural sets (step 205), and the evaluation unit 116 evaluates a result of the estimation of the position and the orientation of the imaging device for each of the plural sets (step 206).

When there is a change in a relative position or orientation between the object on the image captured by the imaging device and the shape represented by the shape information, the generation unit 114 repeats the generation of plural sets, the estimation unit 115 repeats the estimation of the position and the orientation of the imaging device, and the evaluation unit 116 repeats the evaluation of the estimation result. The estimation unit 115 determines the position and the orientation of the imaging device based on a result of the repeated evaluation of the estimation results (step 207).

According to this image processing apparatus 101, a position and an orientation of an imaging device can be efficiently estimated by using an image of an object captured by the imaging device and shape information of the object.

Figure 3:
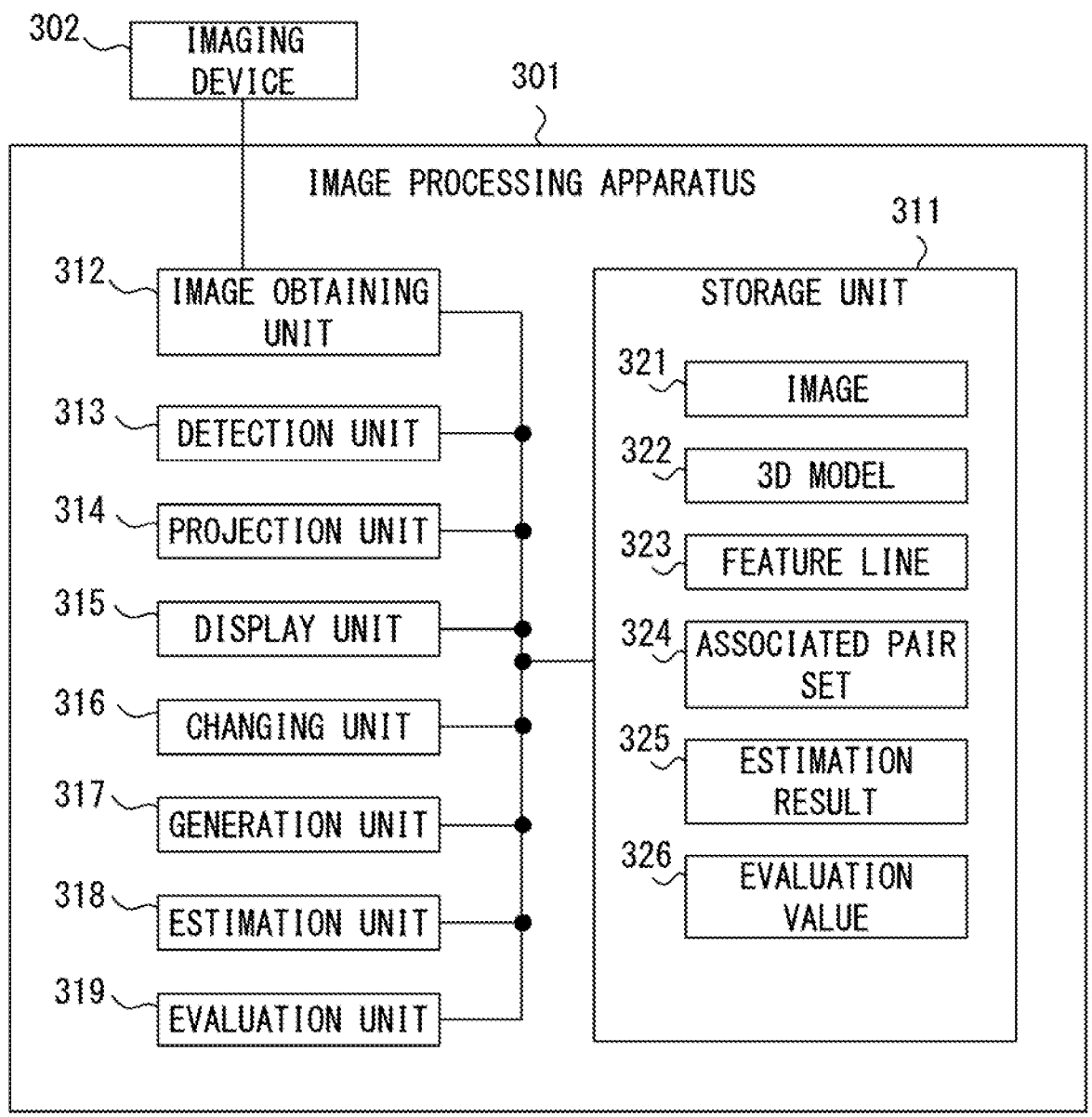
FIG. 3 is a diagram of a functional configuration illustrating a first specific example of an image processing apparatus.

FIG. 3 illustrates a first specific example of the image processing apparatus 101 in FIG. 1. An imaging processing apparatus 301 in FIG. 3 includes a storage unit 311, an image obtaining unit 312, a detection unit 313, a projection unit 314, a display unit 315, a changing unit 316, a generation unit 317, an estimation unit 318, and an evaluation unit 319.

The storage unit 311, the detection unit 313, the projection unit 314, the generation unit 317, the estimation unit 318, and the evaluation unit 319 correspond to the storage unit 111, the detection unit 112, the projection unit 113, the generation unit 114, the estimation unit 115, and the evaluation unit 116 in FIG. 1, respectively.

The image processing apparatus 101 may be a portable terminal device such as a tablet, a laptop PC, and a smart device or may be an information processing apparatus such as a desktop PC.

The imaging device 302 is a camera, for example, having an imaging sensor such as a charge-coupled device (CCD) and a complementary metal-oxide-semiconductor (CMOS) and captures an image 321 of an object. The image obtaining unit 312 obtains the image 321 from the imaging device 302 and stores the image 321 in the storage unit 311. The object to be imaged may be a construction such as a road, a bridge, and a building, or may be a product such as a ship, a vehicle, and an electronic device.

The storage unit 311 stores a three-dimensional model (3D model) 322 that represents a shape of the object captured by the imaging device 302. The 3D model 322 corresponds to the shape information 121 in FIG. 1 and is, for example, CAD data of the object. The 3D model 322 includes vertex information of plural vertices and line information of plural line segments, both of which represent a 3D shape of the object. The vertex information includes 3D coordinates of every vertices of the object, and the line information includes identification information indicating end points that are vertices at both ends of every line segments.

The detection unit 313 detects plural edge lines from the image 321 by performing edge detection processing on the image 321 and stores the detected edge lines in the storage unit 311 as feature lines 323.

The projection unit 314 generates plural projection lines by projecting plural line segments included in the 3D model 322 onto the image 321. The display unit 315 displays the image 321 on a screen and superimposes the plural feature lines 323 on the displayed image 321. The display unit 315 further displays the plural projection lines generated by the projection unit 314 on the screen.

The generation unit 317 generates an associated pair by selecting one feature line from among the plural feature lines 323, selecting one projection line from among the plural projection lines, and associating the selected feature line with the selected projection line. The generation unit 317 generates plural associated pair sets 324 and stores the sets in the storage unit 311. Each of the associated pair sets 324 includes P (P is an integer equal to or greater than 3) associated pairs.

The estimation unit 318 estimates a position and an orientation of the imaging device 302 in a three-dimensional space by using one of the associated pair sets 324 and stores the estimated position and orientation in the storage unit 311 as an estimation result 325.

The evaluation unit 319 evaluates the estimation results 325 obtained for each of the associated pair sets 324. The evaluation unit 319 selects any one of associated pair set 324 from among the plural associated pair sets 324 as a set for evaluation. Next, the evaluation unit 319, using an estimation result 325 obtained from the set for evaluation, generates a projection line for evaluation by reprojecting, on the image 321, a line segment in the 3D model 322 that corresponds to a projection line included in each of associated pairs in each of the associated pair sets 324.

The evaluation unit 319 then calculates an error between a feature line included in the associated pair and the projection line for evaluation, obtains an evaluation value 326 for the associated pair based on the calculated error, and stores the evaluation value 326 in the storage unit 311. The evaluation value 326 may be an evaluation value that becomes smaller as the error becomes larger or may be an evaluation value that becomes larger as the error becomes larger.

When the evaluation value 326 is a value that becomes smaller as the error becomes larger, the evaluation unit 319 calculates the sum of the evaluation values 326 for all associated pairs included in the plural associated pair sets 324 and compares the calculated sum with a threshold. When the sum of the evaluation values 326 obtained by selecting any one of associated pair sets 324 is larger than the threshold, the evaluation unit 319 determines that the estimation is successful. The estimation unit 318 determines the estimation result 325 obtained in accordance with the associated pair set 324 to be a position and an orientation of the imaging device 302.

Using the determined position and orientation of the imaging device 302, the projection unit 314 regenerates plural projection lines by projecting plural line segments included in the 3D model 322 on the image 321, and the display unit 315 superimposes the projection lines on the image 321.

On the other hand, when the sum of the evaluation values 326 is less than the threshold for every associated pair set 324 selected, the evaluation unit 319 determines the estimation to be a failure and outputs information indicating a failure in estimation. The information indicating a failure in estimation may be projection lines superimposed in a warning color different from the color of projection lines superimposed normally, may be a mark or a text message displayed on a screen, or may be a voice message.

When the information indicating the failure in estimation is output, a user changes a position or an orientation of any of the object, the imaging device 302, and the 3D model 322 on the image 321 so that the position and the orientation of the object on the image 321 is closer to the position and the orientation of the 3D model 322.

When the user input an instruction to change the position or the orientation of the 3D model 322, the changing unit 316 changes the position or the orientation of the shape represented by the 3D mode 322 on the image 321 in accordance with the input instruction. In this manner, the relative position or orientation between the object on the image 321 and the shape represented by the 3D model 322 can be changed.

Meanwhile, the user can repeat the imaging of the object by the imaging device 302 after the relative position or orientation between the object and the imaging device 302 is changed as a result of moving the object or the imaging device 302. In this case, also, the relative position or orientation between the object on the image 321 and the shape represented by the 3D model 322 can be changed.

When the relative position or orientation between the object and the shape represented by the 3D model 322 is changed in the above manner, the generation unit 317 repeats generation of plural associated pair sets 324. The estimation unit 318 repeats the estimation of the position and the orientation of the imaging device 302, and the evaluation unit 319 repeats the evaluation of the estimation result 325.

In this case, the estimation unit 318 identifies a set for evaluation from which the sum of the evaluation values 326 larger than the threshold is obtained in the result of the repeated evaluation of the estimation results 325. The estimation unit 318 determines the estimation result 325 obtained from the identified set for evaluation to be the position and the orientation of the imaging device 302.

According to the image processing apparatus 301 in FIG. 3, a user can make the position and the orientation of an object on the image 321 closer to the position and the orientation of the 3D model 322 by changing the position or orientation of the object, the imaging device 302, or the 3D model 322. When the associated pair set 324 is generated in a state in which the object on the image 321 and the 3D model 322 almost overlap with each other, a reliable estimation result 325 can be obtained, and as a result, a position and an orientation of the imaging device 302 can be determined in a short period of time. This reduces the operational workload of the user and enables efficient estimation of a position and an orientation of the imaging device 302.

In addition, since an estimation result 325 obtained from an associated pair set 324 is evaluated by using an evaluation value 326 that becomes smaller as an error becomes larger, a failure in estimation caused by an error of an erroneously associated pair can be avoided. Even though an erroneously associated pair is included in an associated pair set 324, an associated pair set 324 that generates a good estimation result 325 can be identified.

When a value that becomes larger as an error becomes larger is used for the evaluation value 326, an erroneously associated pair can be removed, normally, by robust estimation such as random sample consensus (RANSAC) and the least median of squares.

The generation unit 317 selects a feature line 323 or a projection line as a reference line segment from among plural feature lines 323 or plural projection lines and narrows down candidate line segments that are associated with the reference line segment from among the projection lines or feature lines 323 located around the reference line segment. The generation unit 317 can narrow down candidate line segments, for example, by filtering line segments by angle, by filtering line segments by distance, or by filtering line segments by positional relationship.

In the filtering by angle, when an angle between a candidate line segment and the reference line segment is a specific value or larger, the candidate line segment is excluded. In the filtering by distance, when a distance between the reference line segment and a candidate line segment is a specific value or longer, the candidate line segment is excluded. In the filtering by positional relationship, when a position of a candidate line segment is shifted from a position of the reference line segment in a direction of the reference line segment, the candidate line segment is excluded.

Figure 4:
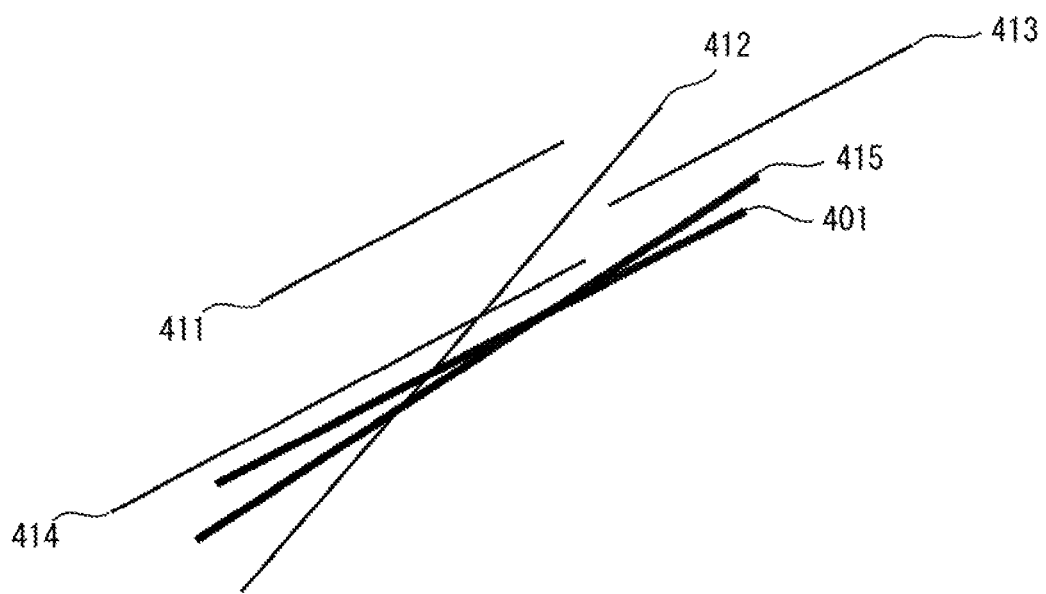
FIG. 4 is a diagram illustrating projection lines and feature lines.

FIG. 4 illustrates an example of projection lines and feature lines when the position and orientation of the object on the image 321 are closer to the position and orientation of the 3D model 322. The generation unit 317 selects a projection line 401 as a reference line segment, for example, and narrows down candidate line segments from among feature lines 411 to 415 that are located around the projection line 401.

As an example of filtering conditions, in filtering by angle, the feature line 412 is excluded because an angle between the projection line 401 and the feature line 412 is 15 degrees or larger. In filtering by distance, the feature line 411 is excluded because a distance between the projection line 401 and the feature line 411 is ¼ of the length of the projection line 401 or longer. In filtering by positional relationship, the feature line 413 is excluded because the position of the feature line 413 is shifted from the position of the projection line 401 in the direction of the projection line 401.

The generation unit 317 selects, from the remaining feature lines 414 and 415, the feature line 415 that has the shorter distance from the projection line 401, associating the projection line 401 with the feature line 415, and generates an associated pair.

In this manner, when the position and orientation of the object on the image 321 are closer to the position and orientation of the 3D model 322, an associated pair can be readily generated by appropriate filtering.

The evaluation unit 319 selects an associated pair set 324 from among plural associated pair sets 324 in descending order of error tolerance, for example, and the estimation unit 318 estimates a position and orientation of the imaging device 302 by using the selected associated pair set 324. The error tolerance refers to a tolerance of estimation processing to a detected error of the feature line 323 and can be obtained by an analysis method disclosed in Non-patent Document 2 for example.

Normally, the position and orientation of the imaging device 302 are determined by using four or more associated pairs, but when three associated pairs are used, the estimation result 325 will include scale ambiguity that is one type of bas-relief ambiguity or depth reversal ambiguity. However, when the analysis method disclosed in Non-patent Document 2 is used, for example, the error tolerance becomes low in the associated pair set 324 with scale ambiguity, and such associated pair set 324 can be excluded. When the position and orientation of the object on the image 321 are closer to the position and orientation of the 3D model 322, the estimation result 325 with depth reversal ambiguity can be readily excluded because such a result is significantly different from the position and orientation of the 3D model 322 at the time of generating projection lines. Consequently, the estimation result 325 can be determined by using three associated pairs.

The evaluation unit 319 can calculate an error between a feature line and a projection line based on a distance between the feature line and the projection line by means of a calculation method disclosed in Non-patent Document 1, for example. The evaluation unit 319 can also calculate an error based on an area of a region between a feature line and a projection line.

Figure 5:
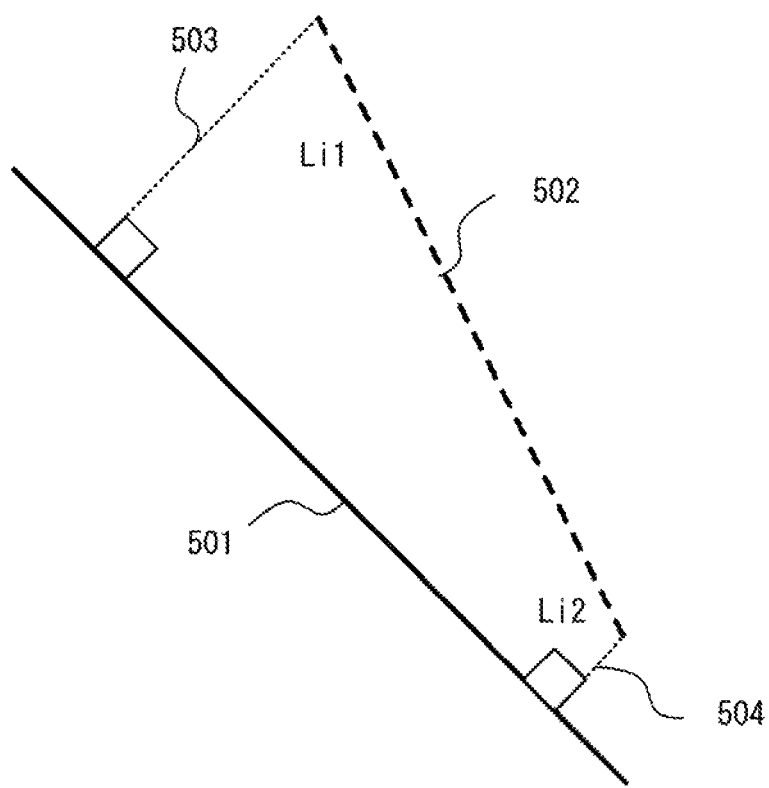
FIG. 5 is a diagram of a calculation method based on a distance.

FIG. 5 illustrates an example of a calculation method based on a distance between a feature line and a projection line. In this example, the total number of associated pairs included in plural associated pair sets 324 is N (N is an integer of three or larger), a projection line included in the i-th (i=1 to N) associated pair is a line segment 501, and a feature line is a line segment 502.

The length of a perpendicular line 503 and the length of a perpendicular line 504 that are drawn from respective ends of the line 502 to the line 501 are denoted as Li1 and Li2, respectively. In this case, the sum of Li1 and Li2 can be used as an error Ei between the feature line and the projection line.

$$Ei = Li1 + Li2 \quad (1)$$

As Li1 and Li2 become shorter, the error Ei becomes smaller, and when the line 502 overlaps the line 501, the error Ei is 0.

Figure 6:
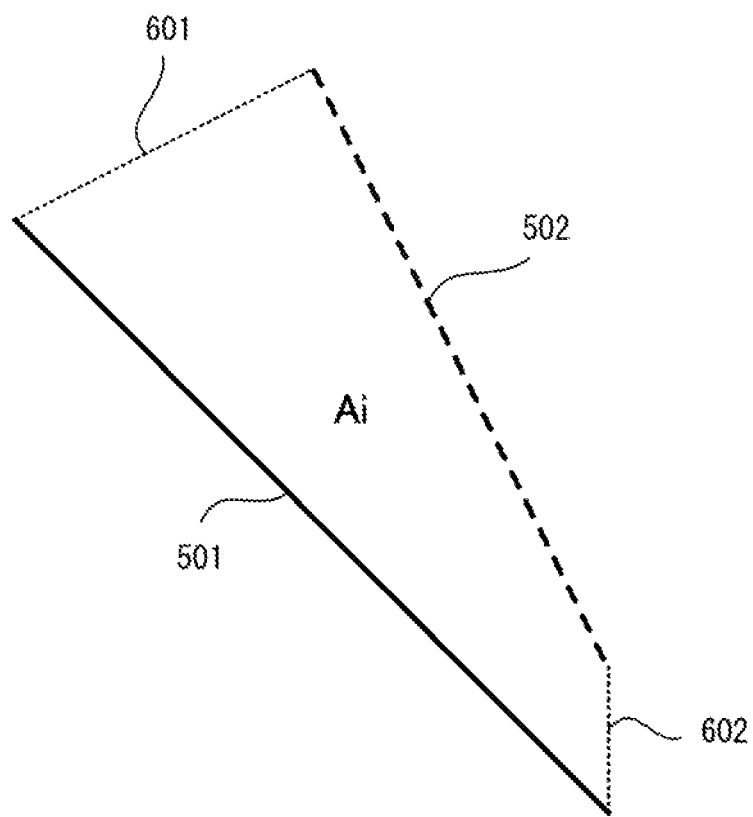
FIG. 6 is a diagram of a calculation method based on an area of a region.

FIG. 6 illustrates an example of a calculation method based on an area of a region between a feature line and a projection line. When a line segment 601 connecting one end of the line segment 501 with one end of the line segment 502 and a line segment 602 connecting another end of the line segment 501 with another end of the line segment 502 are defined, an area Ai of a region surrounded by the line segments 501, 502, 601, and 602 can be used as an error Ei.

$$Ei = Ai \quad (2)$$

The error Ei is smaller when the area Ai is smaller, and when the line 502 overlaps the line 501, the error Ei becomes 0.

The evaluation unit 319 can calculate an evaluation value Score(i) for the i-th associated pair by using the error Ei in accordance with the following equations as an example.

$$\text{Score}(i) = 1 \, (Ei < T1) \quad (3)$$

$$\text{Score}(i) = (T1/Ei)^2 \, (Ei \geq T1) \quad (4)$$

T1 denotes a threshold determined by a simulation etc. In accordance with the equation (3) and the equation (4), when $Ei < T1$, $\text{Score}(i) = 1$, and when $Ei \geq T1$, $\text{Score}(i) \geq 1$. Accordingly, Score(i) becomes smaller when Ei is larger. The sum S of Score(i) for all associated pairs is calculated in accordance with the following equation.

$$S = \sum_{i=1}^{N} \text{Score}(i) \quad (5)$$

The evaluation unit 319 determines whether an estimation has been successful or failed by comparing the sum S with a threshold T2. When the sum S obtained by selecting any one of the associated pair sets 324 is equal to or larger than the threshold T2, the estimation is determined to be successful, and the sum S is less than the threshold T2 for every associated pair set 324 selected, the estimation is determined to be a failure. The threshold T2 is calculated in accordance with the following equation by using the total number N of the associated pairs as an example.

$$T2 = T\min + k \times (N - N\min) \quad (6)$$

In the equation (6), T min denotes the minimum value of T2 and N min denotes the minimum value of N. T min, N min, and the coefficient k are parameters determined by a simulation etc.

The contribution of an abnormal value of Ei to the sum S can be kept low by the use of Score(i) from the equation (3) and the equation (4). This results in avoidance of a failure in estimation due to the error of the erroneously associated pair and also results in an increase in an accuracy of determination of whether the estimation is successful or not.

A position or an orientation of an object or the imaging device 302 can be changed by a user moving the object or the imaging device 302 at will in a three-dimensional space. However, to change a position or orientation of the 3D model 322 on the image 321, the user uses an input device such as a mouse to give an instruction of parallel shift and rotation of the 3D model 322 on the image 321, and this makes intuitive inputs of instructions difficult.

In view of this point, the changing unit 316 limits an axis of rotation of the 3D model 322 to a specific line and changes a position or an orientation of the 3D model 322 by rotating the 3D model 322 around the axis of rotation in accordance with the input instruction. The axis of rotation may be a line segment selected from plural line segments included in the 3D model 322, or a normal line of a plane including the selected line segment and a viewpoint for the 3D model 322 as an example.

Figure 7:
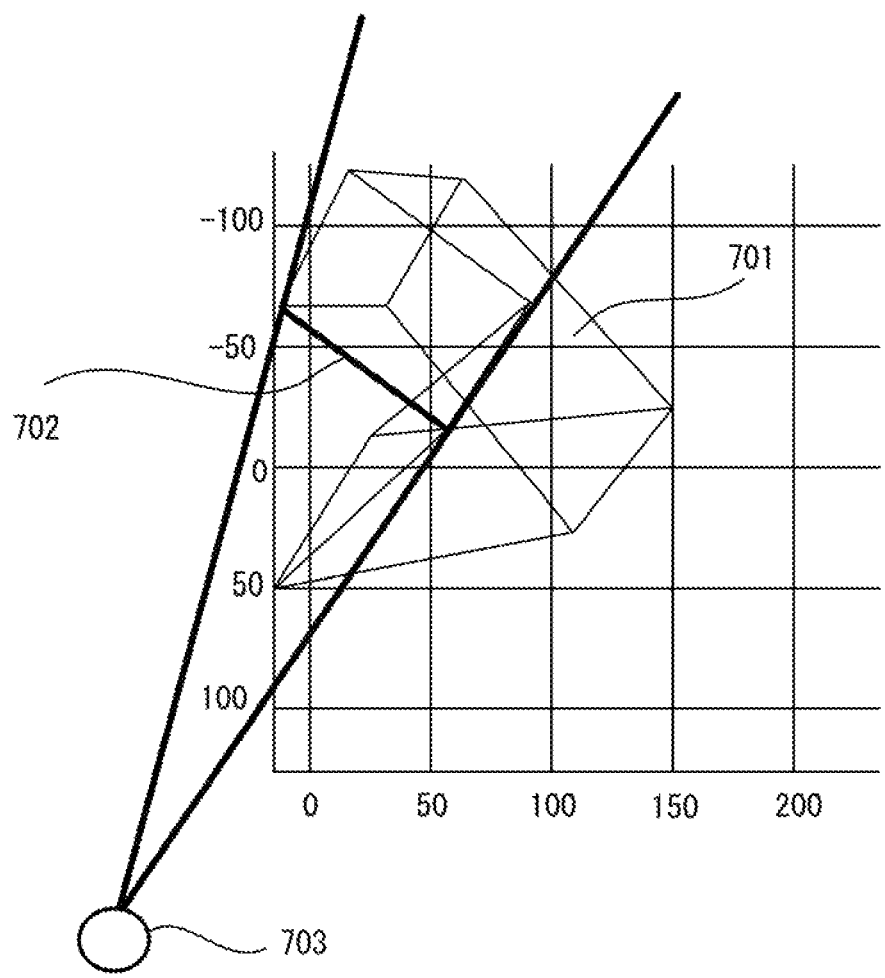
FIG. 7 is a diagram illustrating a line segment of a 3D model and a viewpoint.

FIG. 7 illustrates an example of a line segment of the 3D model 322 and a viewpoint. In FIG. 7, the horizontal direction of the image 321 is on the horizontal axis and the vertical direction of the image 321 is on the vertical axis. A 3D model 701 is a 3D model projected on the image 321 with a viewpoint 703 being a projection center, and a line segment 702 is a line segment selected from plural line segments included in the 3D model 322. In this case, the line segment 702 or a normal line of a plane including the line segment 702 and the viewpoint 703 will be designated as an axis of rotation.

Figure 8A:
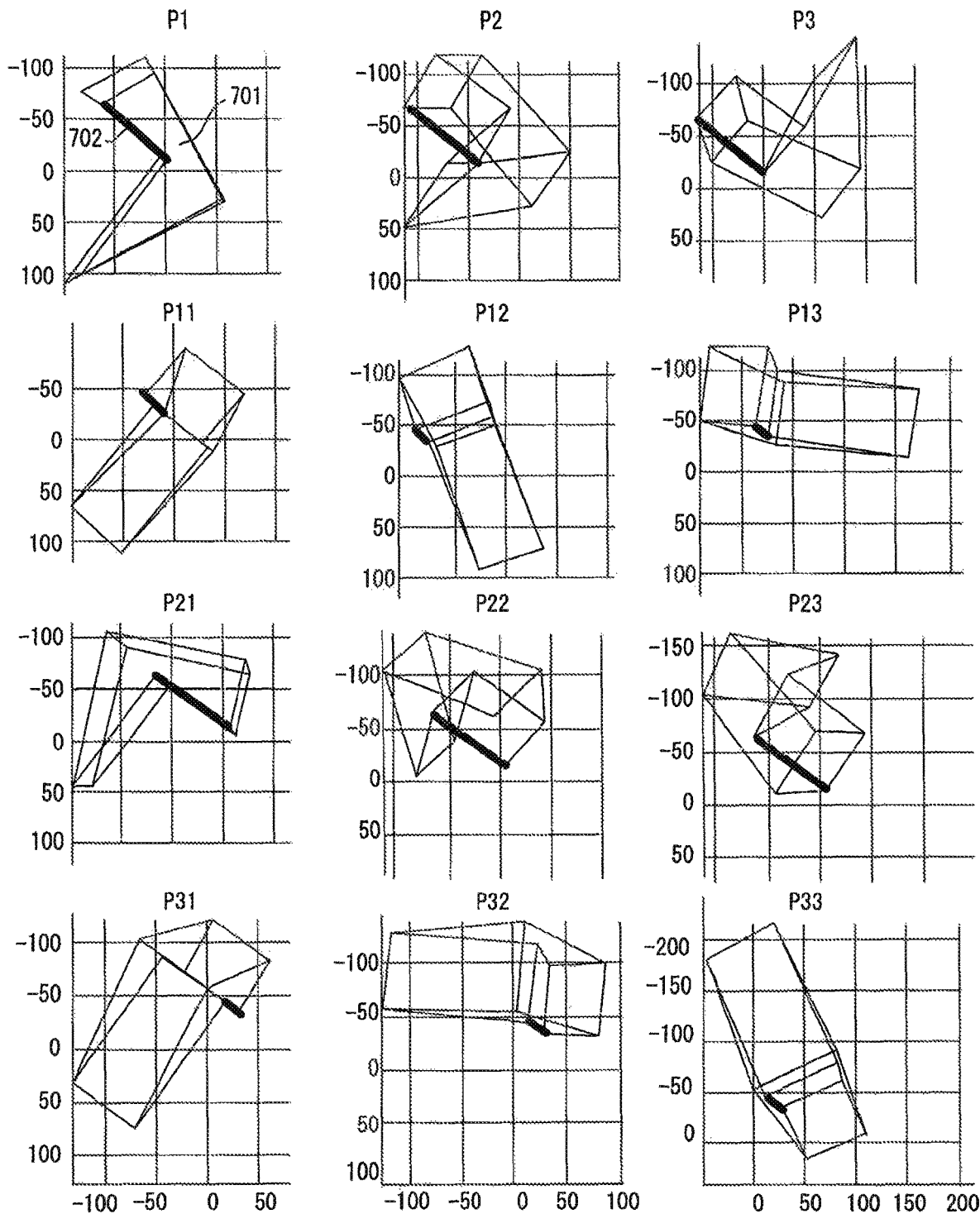
FIG. 8A is a first diagram illustrating orientations of a 3D model.
Figure 8B:
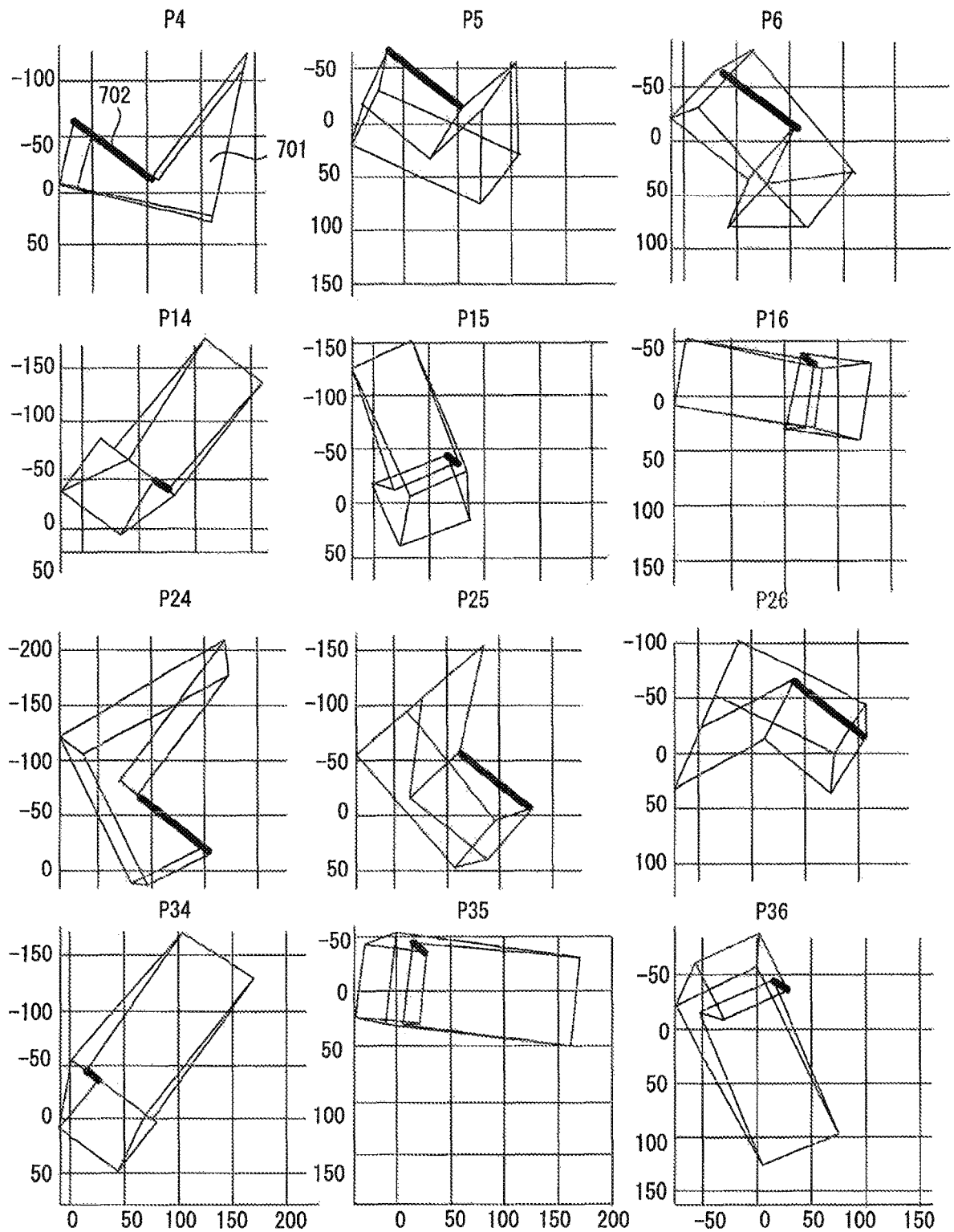
FIG. 8B is a second diagram illustrating orientations of a 3D model.

FIG. 8A and FIG. 8B illustrate an example of an orientation of the 3D model 322 rotated around the designated axis of rotation. Here, the rotational angle around the line segment 702 in FIG. 7 is θ1, and the rotational angle around a normal line that passes through the midpoint of the line segment 702 on a plane including the line segment 702 and the viewpoint 703 is θ2. In this case, in FIG. 8A, θ1 and θ2 in orientations P1 to P3, those in orientations P11 to P13, those in orientations P21 to P23, and those in orientations P31 to P33 are provided below.

P1: θ1=0°, θ2=0°
P2: θ1=60°, θ2=0°
P3: θ1=120°, θ2=0°
P11: θ1=0°, θ2=90°
P12: θ1=60°, θ2=90°
P13: θ1=120°, θ2=90°
P21: θ1=0°, θ2=180°
P22: θ1=60°, θ2=180°
P23: θ1=120°, θ2=180°
P31: θ1=0°, θ2=270°
P32: θ1=60°, θ2=270°
P33: θ1=120°, θ2=270°

In FIG. 8B, θ1 and θ2 in orientations P4 to P6, those in orientations P14 to P16, those in orientations P24 to P26, and those in orientations P34 to P36 are provided below.

P4: θ1=180°, θ2=0°
P5: θ1=240°, θ2=0°
P6: θ1=300°, θ2=0°
P14: θ1=180°, θ2=90°
P15: θ1=240°, θ2=90°
P16: θ1=300°, θ2=90°
P24: θ1=180°, θ2=180°
P25: θ1=240°, θ2=180°
P26: θ1=300°, θ2=180°
P34: θ1=180°, θ2=270°
P35: θ1=240°, θ2=270°
P36: θ1=300°, θ2=270°

As will be appreciated from FIG. 8A and FIG. 8B, when the 3D model 322 rotates around the line segment 702, the direction and the length of the projection line of the line segment 702 do not change on the image 321. When the 3D model 322 rotates around the normal line of the plane including the line segment 702 and the viewpoint 703, the direction of the projection line of the line segment 702 does not change on the image 321.

In this manner, by limiting the axis of rotation of the 3D model 322 to the line segment 702 or a normal line of a plane including the line 702 and the viewpoint 703, the user can readily rotate the 3D model 322 and have the 3D model 322 overlap with the object on the image 321.

Figure 9:
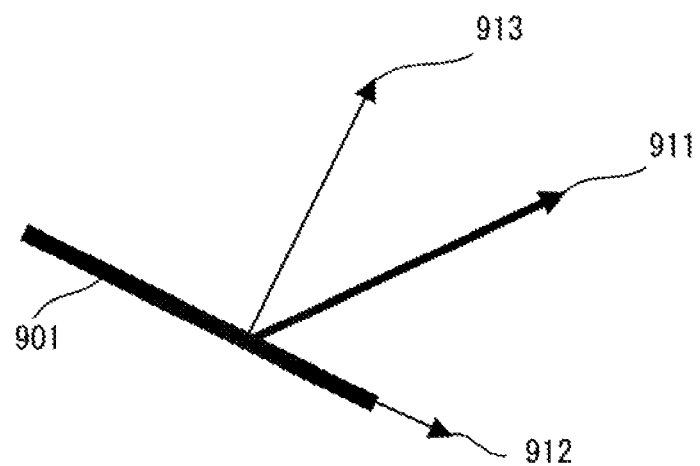
FIG. 9 is a diagram illustrating moving operations of a projection line.

FIG. 9 illustrates an example of moving operations of a projection line at the time of rotating the 3D model 322. A projection line 901 is a projection line of a selected line segment. When a user carries out a moving operation of the projection line 901 as indicated by a moving vector 911 by using an input device such as a mouse, the changing unit 316 resolves the moving vector 911 into a component 912 that is parallel to the projection line 901 and a component 913 that is perpendicular to the projection line 901.

The changing unit 316, next, converts the perpendicular component 913 into an amount of rotation $\Delta\theta1$ around the selected line segment and also converts the parallel component 912 into an amount of rotation $\Delta\theta2$ around a normal line of a plane including the selected line segment and a viewpoint. In this case, an amount of rotation that is proportional to the component 913 can be used as $\Delta\theta1$ and an amount of rotation that is proportional to the component 912 can be used as $\Delta\theta2$. The changing unit 316 causes the 3D model 322 to rotate around the selected line segment by $\Delta\theta1$ and also causes the 3D model 322 to rotate around the normal line by $\Delta\theta2$.

Figure 10:
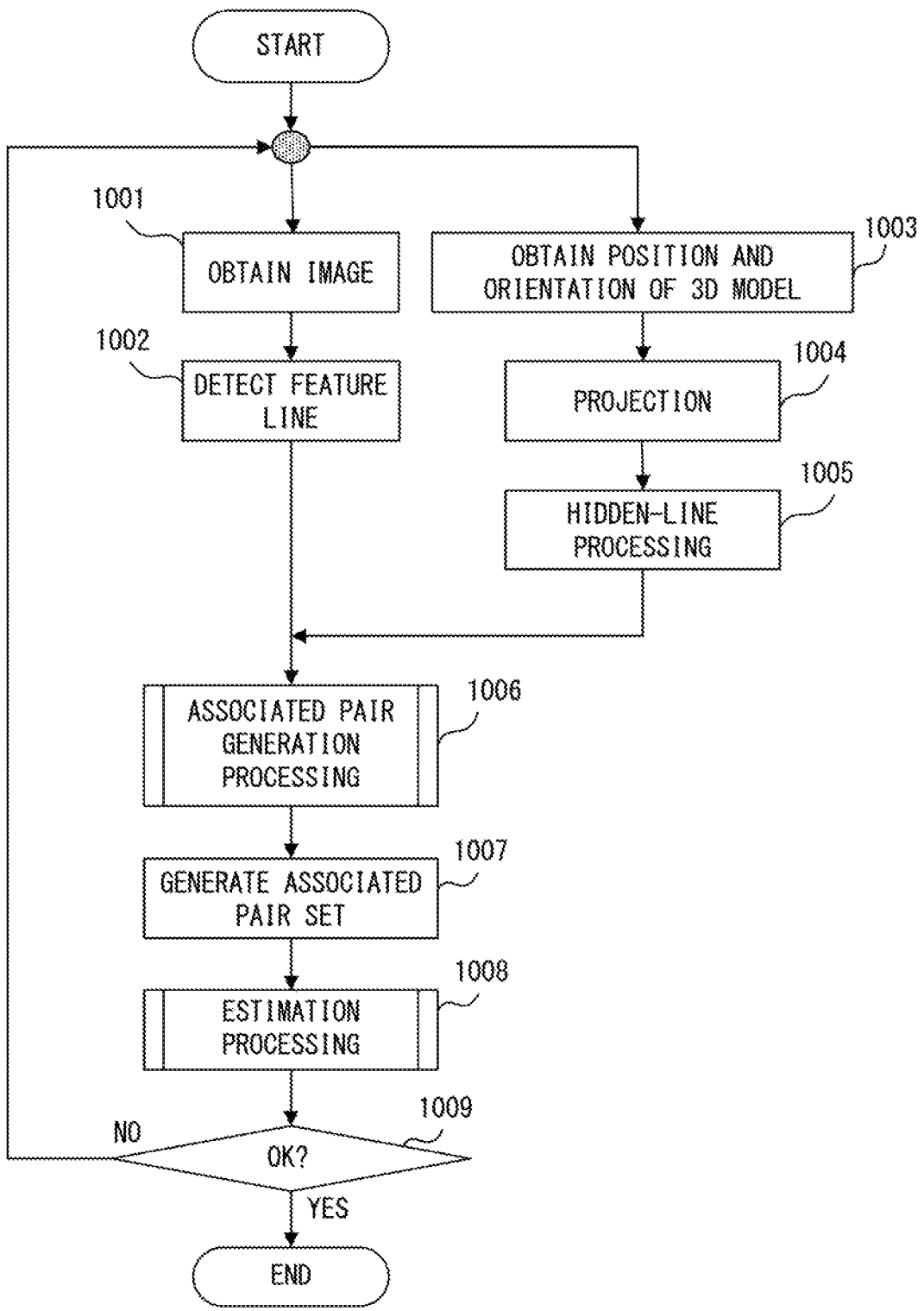
FIG. 10 is a flowchart of the first specific example of image processing.

FIG. 10 is a flowchart of the first specific example of image processing performed by the image processing apparatus 301 in FIG. 3. The image obtaining unit 312 obtains an image 321 from the imaging device 302 (step 1001), and the detection unit 313 detects plural feature lines 323 from the image 321 (step 1002).

The projection unit 314 obtains a position and an orientation of the 3D model 322 in a three-dimensional space (step 1003) and generates plural projection lines by projecting plural line segments of the 3D model 322 on the image 321 (step 1004). The projection unit 314, next, carries out hidden-line processing of the generated projection lines to eliminate hidden lines (step 1005). The display unit 315 displays, on a screen, the image 321, the plural feature lines 323, and plural projection lines representing the 3D model 322.

The generation unit 317 carries out associated pair generation processing to generate plural associated pairs from the plural feature lines 323 and the plural projection lines (step 1006) and generates plural associated pair sets 324 from the associated pairs (step 1007). The estimation unit 318 estimates a position and an orientation of the imaging device 302 by means of estimation processing by using the plural associated pair sets 324 and generates an estimation result 325 (step 1008).

The evaluation unit 319 determines whether an estimation of the estimation processing has been successful or not (OK or not) (step 1009) and when the estimation was a failure (step 1009, NO), the evaluation unit 319 outputs information indicating a failure in estimation. In this case, a user changes a position or an orientation of any of the object, the imaging device 302, or the 3D model 322 on the image 321, and the image processing apparatus 301 repeats the processing in step 1001 and subsequent processing. When the estimation was successful (step 1009, YES), the image processing apparatus 301 ends the processing.

Figure 11:
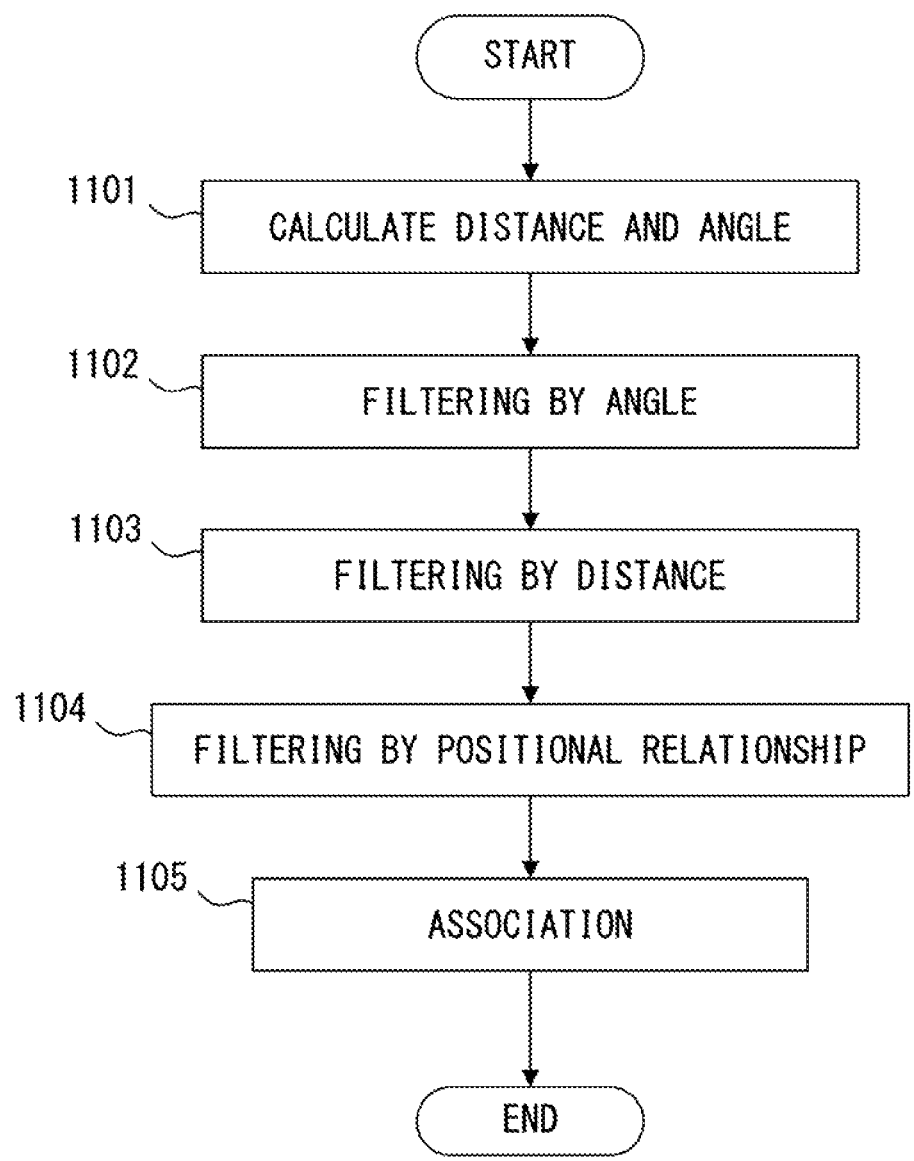
FIG. 11 is a flowchart of associated pair generation processing.

FIG. 11 is a flowchart of an example of associated pair generation processing in step 1006 in FIG. 10. The generation unit 317 calculates a distance and an angle between each of the feature lines 323 and each of the projection lines (step 1101).

The generation unit 317, next, selects a feature line 323 or a projection line as a reference line segment and carries out filtering of candidate line segments by angle (step 1102). The generation unit 317, next, carries out filtering by distance (step 1103) and also carries out filtering by positional relationship (step 1104). The generation unit 317 selects, from among the remaining candidate line segments, a candidate line segment that is located in the shortest distance from the reference line segment, associates the selected candidate line segment with the reference line segment, and generates an associated pair (step 1105).

The generation unit 317 generates plural associated pairs by carrying out the processing in steps 1102 to 1105 to each of the plural reference line segments. However, when a line segment on the object that corresponds to a projection line displayed on a screen is not detected as a feature line 323 or is detected as non-continuous plural feature lines 323, an associated pair including the projection line is not always generated.

Figure 12:
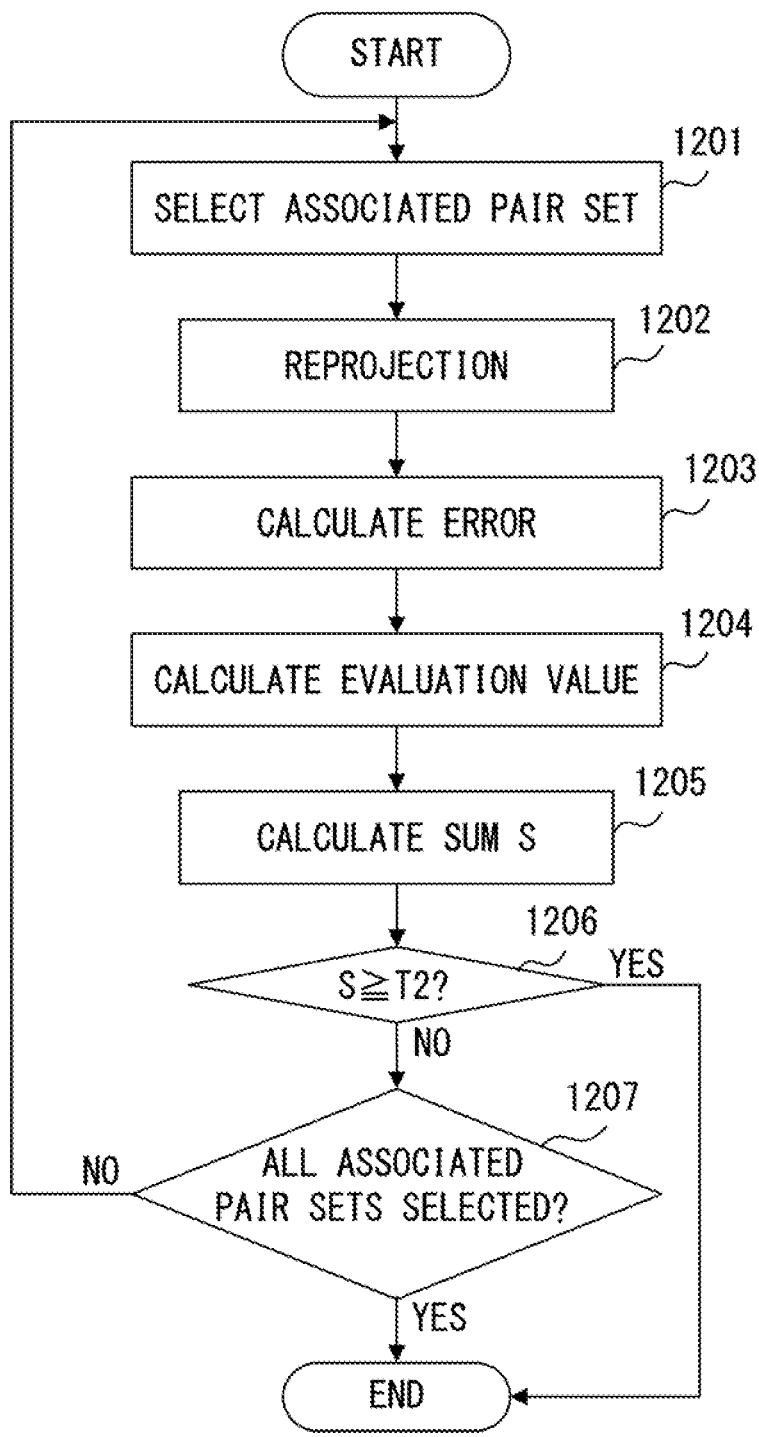
FIG. 12 is a flowchart of estimation processing.

FIG. 12 is a flowchart illustrating an example of estimation processing in step 1008 in FIG. 10. The evaluation unit 319 selects an associated pair set 324 as a set for evaluation from among the plural associated pair sets 324 in descending order of error tolerance (step 1201). The estimation unit 318 estimates a position and an orientation of the imaging device 302 by using the set for evaluation and generates an estimation result 325.

By using the generated estimation result 325, the evaluation unit 319, next, generates N projection lines for evaluation by reprojecting, on the image 321, line segments corresponding to N projection lines included in the plural associated pair sets 324 (step 1202).

The evaluation unit 319, next, calculates errors E1 to EN from N feature lines associated with the N projection lines and the N projection lines for evaluation (step 1203). The evaluation unit 319, next, calculates Score(1) to Score(N) by using the equation (3), the equation (4) and the errors E1 to EN (step 1204).

The evaluation unit 319, next, calculates the sum S from the equation (5) by using Score(1) to Score(N) and compares the sum S with a threshold T2 (step 1206). When the sum S is less than the threshold T2 (step 1206, NO), the evaluation unit 319 checks whether all of the associated pair sets 324 are selected or not (step 1207). When there is any unselected associated pair set 324 remaining (step 1207, NO), the image processing apparatus 301 repeats the processing in step 1201 and the subsequent processing to search for the next error-tolerant associated pair set 324.

When the sum S is equal to or larger than the threshold T2 (step 1206, YES), the estimation unit 318 determines the estimation result 325 obtained from the set for evaluation to be the position and orientation of the imaging device 302. Using the determined position and orientation of the imaging device 302, the projection unit 314 projects plural line segments included in the 3D model 322 on the image 321, and the display unit 315 superimposes the 3D model 322 on the image 321. In this case, the evaluation unit 319 determines the estimation to be successful in step 1009 in FIG. 10.

Meanwhile, when all the associated pair sets 324 have been selected (step 1207, YES), the image processing apparatus 301 ends the processing. In this case, the evaluation unit 319 determines the estimation to be a failure in step 1009 in FIG. 10.

Figure 13:
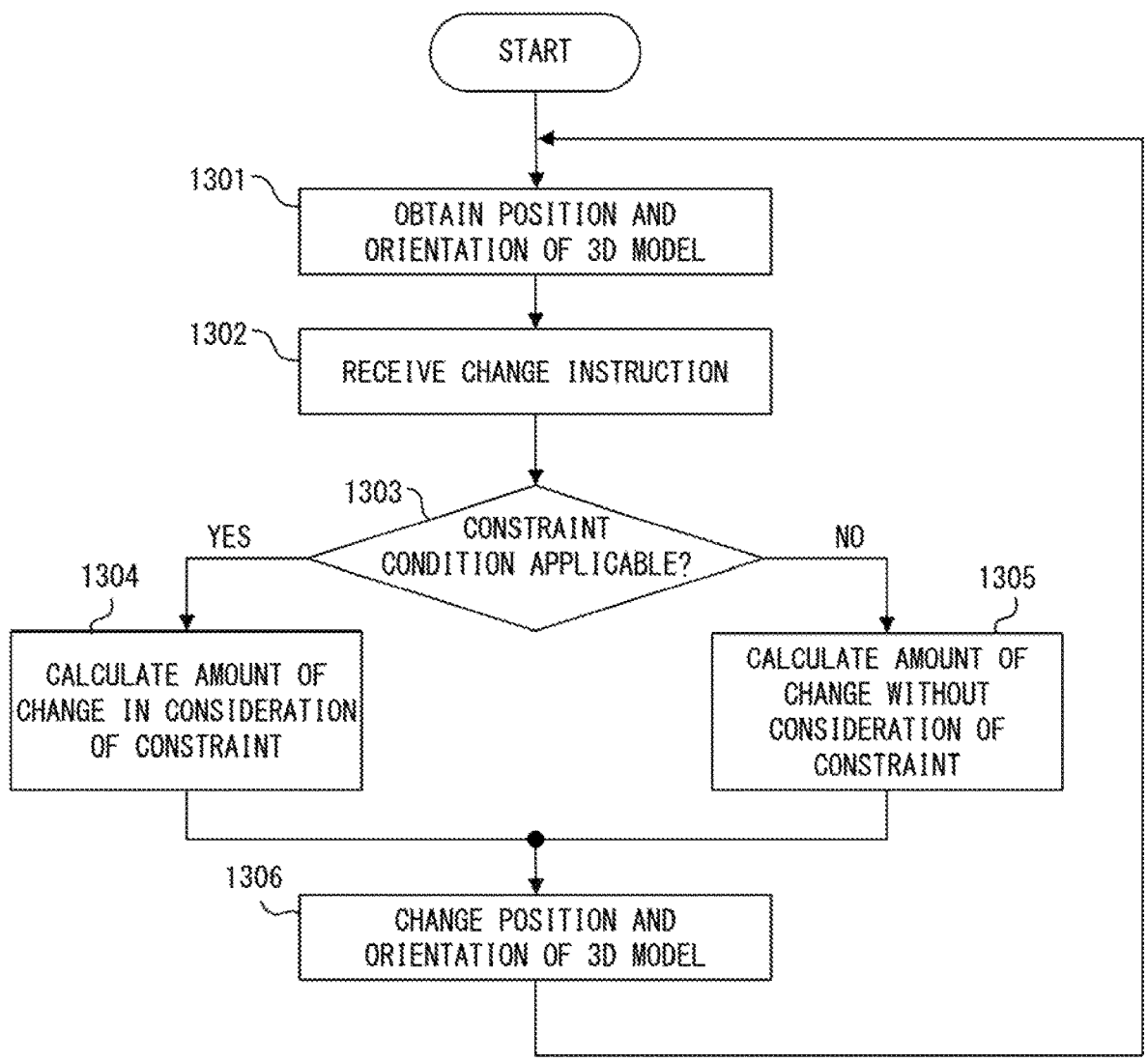
FIG. 13 is a flowchart of changing processing.

FIG. 13 is a flowchart of an example of changing processing carried out by the image processing apparatus 301 in FIG. 3. The changing processing in FIG. 13 is carried out independently from the image processing in FIG. 10. The changing unit 316 obtains a position and an orientation of the 3D model 322 in the three-dimensional space (step 1301) and receives a change instruction to change the 3D model 322 that is input by a user (step 1302).

The changing unit 316, next, determines whether a constraint condition is applicable or not to the rotation operation of the 3D model 322 (step 1303). For example, when the change instruction includes a selection instruction that designate a specific line segment to be selected, the changing unit determines the constraint condition to be applicable, and when the change instruction does not include such a selection instruction, the changing unit determines the constraint condition to be not applicable.

When a constraint condition is applicable (step 1303, YES), the changing unit 316 calculates an amount of change in consideration of the constraint (step 1304). For example, when the constraint condition includes a limitation to the axes of rotation as illustrated in FIG. 8A and FIG. 8B, in accordance with a moving operation included in a change instruction, the changing unit 316 resolves a moving vector into a component parallel to a projection line of the selected line segment and a component perpendicular to the projection line of the selected line segment, as illustrated in FIG. 9. Afterwards, the changing unit 316 calculates an amount of rotation $\Delta\theta 1$ around the selected line and an amount of rotation $\Delta\theta 2$ around a normal line of a plane including the selected line segment and a viewpoint.

On the other hand, when a constraint condition is not applicable (step 1303, NO), the changing unit 316 calculates an amount of change without consideration of any constraint (step 1305). In this case, the changing unit 316 calculates an amount of rotation in accordance with a rotation operation included in the change instruction.

The changing unit 316, next, changes a position and an orientation of the 3D model 322 by using the calculated amount of change (step 1306). When the amount of rotation $\Delta\theta 1$ and the amount of rotation $\Delta\theta 2$ are calculated in step 1304, the changing unit 316 causes the 3D model 322 to rotate around the selected line segment by $\Delta\theta 1$ and also causes the 3D model 322 to rotate around the normal line by $\Delta\theta 2$. Meanwhile, when an amount of rotation is calculated in step 1305, the changing unit 316 rotates the 3D model 322 by the amount of rotation. The changing unit 316 repeats the processing in step 1301 and the subsequent steps.

Note that when a received change instruction includes a parallel shift, the changing unit 316 calculates an amount of shift of the parallel shift in step 1304 or step 1305 and causes the 3D model 322 to make the calculated amount of parallel shift.

In this manner, when the position or the orientation of the 3D model 322 is changed, the projection unit 314 obtains the changed position and orientation of the 3D model 322 in step 1003 in FIG. 10.

Figure 14:
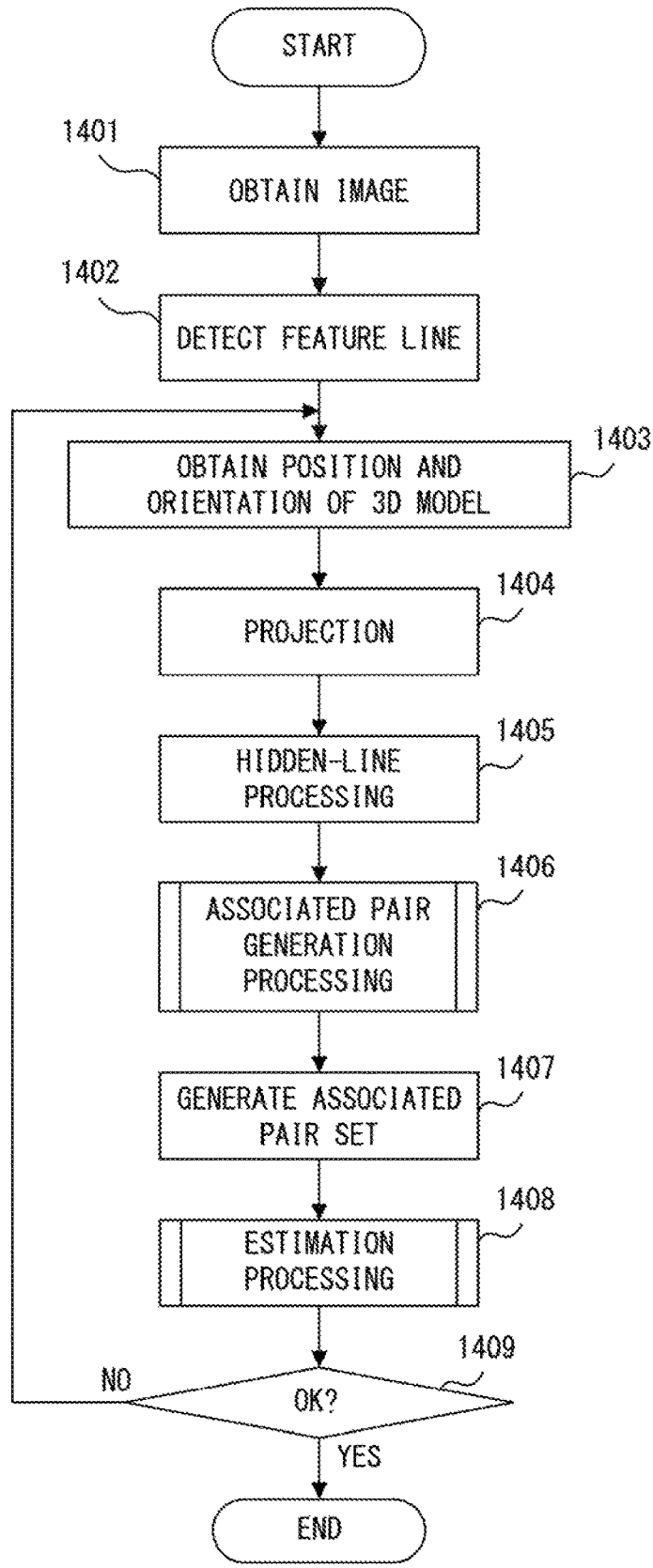
FIG. 14 is a flowchart of the second specific example of image processing.

FIG. 14 is a flowchart of the second specific example of image processing carried out by the image processing apparatus 301 in FIG. 3. The processing in steps 1401 to 1409 is the same as the processing in steps 1001 to 1009.

When an estimation was a failure (step 1409, NO), the evaluation unit 319 outputs information indicating a failure in estimation. In this case, a user changes a position or orientation of the 3D model 322 on the image 321 without changing a position and an orientation of an object and the imaging device 302, and the image processing apparatus 301 repeats the processing in step 1403 and the subsequent steps. Consequently, the image 321 is not updated and the processing in steps 1403 to 1409 is carried out by using the same image 321.

In the image processing in FIG. 14, when many parallel line segments are included in the 3D model 322, a lot of erroneously associated pairs may be generated during the operation that the user changes the position or orientation of the 3D model 322. In such a case, even when a feature line 323 and a projection line of a line segment included in the 3D model 322 are erroneously associated, the sum S is equal to or larger than the threshold T2. As a result, the generated estimation result 325 is erroneous but the processing will end.

Figure 15:
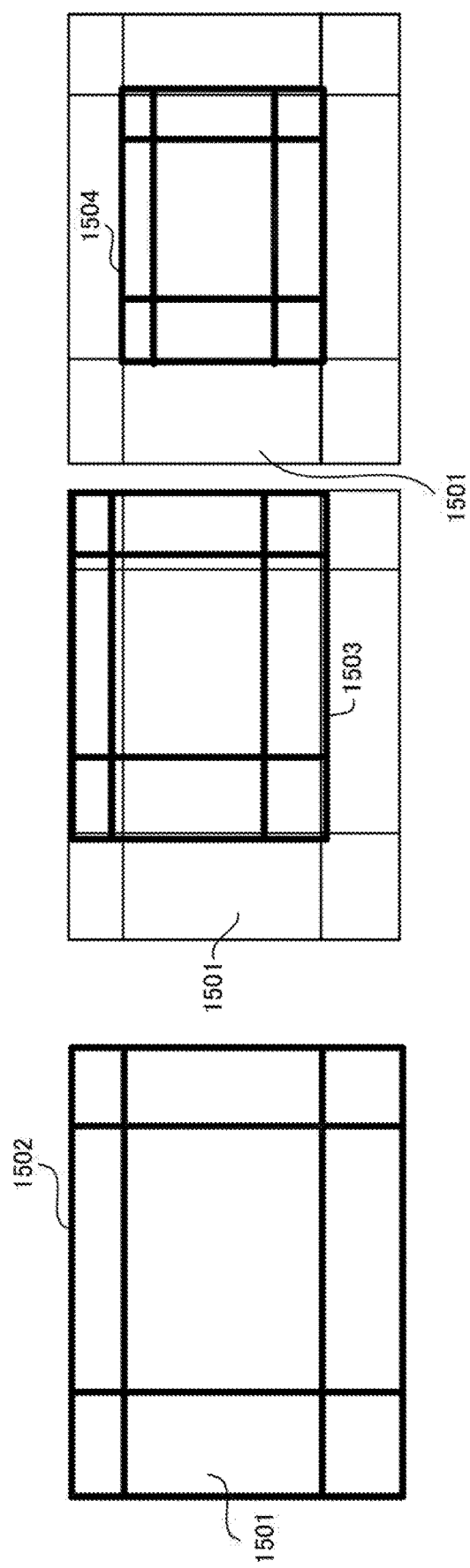
FIG. 15A illustrates a 3D model superimposed on an image based on a correct estimation result.
FIG. 15B illustrates the 3D model superimposed on an area of the upper right portion of the image based on an erroneous estimation result.
FIG. 15C illustrates the 3D model superimposed on an area of the center portion of the image based on an erroneous estimation result.

FIG. 15A to FIG. 15C illustrate examples of the 3D model 322 superimposed on the image 321 based on the estimation result 325. In these examples, four feature lines that are in parallel to the horizontal direction and four feature lines that are in parallel to the vertical direction are included in an image 1501 of an object. Similarly, four projection lines that are in parallel to the horizontal direction and four projection lines that are in parallel to the vertical direction are included in a shape 1502 to a shape 1504 that are the 3D model 322 of the object projected on the image 1501.

FIG. 15A illustrates an example of the shape 1502 superimposed on the image 1501 based on a correct estimation result 325. FIG. 15B illustrates an example of the shape 1503 superimposed on an area of the upper right portion of the image 1501 based on an erroneous estimation result 325. FIG. 15C illustrates an example of the shape 1504 superimposed on an area of the center portion of the image 1501 based on another erroneous estimation result 325.

In order to prevent generation of the estimation results 325 as in FIG. 15B and FIG. 15C, adding a function to restrain the operation of the estimation unit 318 during the change operation performed by the user is effective.

Figure 16:
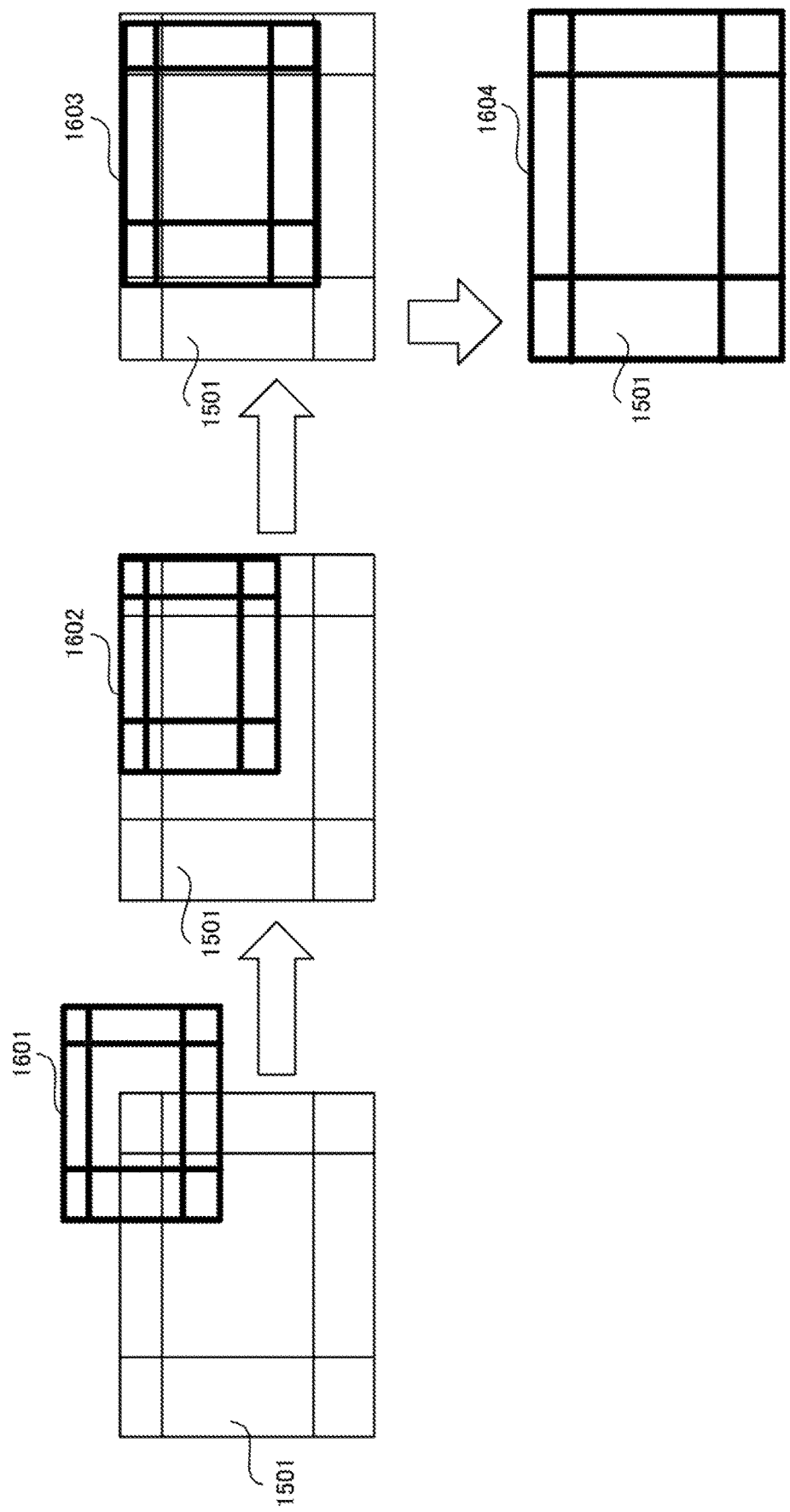
FIG. 16 is a diagram illustrating image processing to restrain an operation of an estimation unit.

FIG. 16 illustrates an example of image processing to restrain the operation of the estimation unit 318. A shape 1601 to a shape 1604 represent shapes of the 3D model 322 projected on the image 1501. First, when a user changes a position of the 3D model 322 while the FIG. 1601 is superimposed on the image 1501, the FIG. 1601 changes to the FIG. 1602. Next, when the user changes the position of the 3D model 322 in depth direction, the FIG. 1602 changes to the FIG. 1603.

Here, when the FIG. 1603 is associated with the area of the upper right portion of the image 1501, an erroneous estimation result 325 as illustrated in FIG. 15B may possibly be generated. The user therefore restrains the operation of the estimation unit 318. The user is thereby able to further change the position of the 3D model 322 in depth direction, and the FIG. 1603 changes to the FIG. 1604. Because the FIG. 1604 is correctly superimposed on the image 1501, the user releases the restraint of the estimation unit 318. In this manner, a correct estimation result 325 can be generated.

Figure 17:
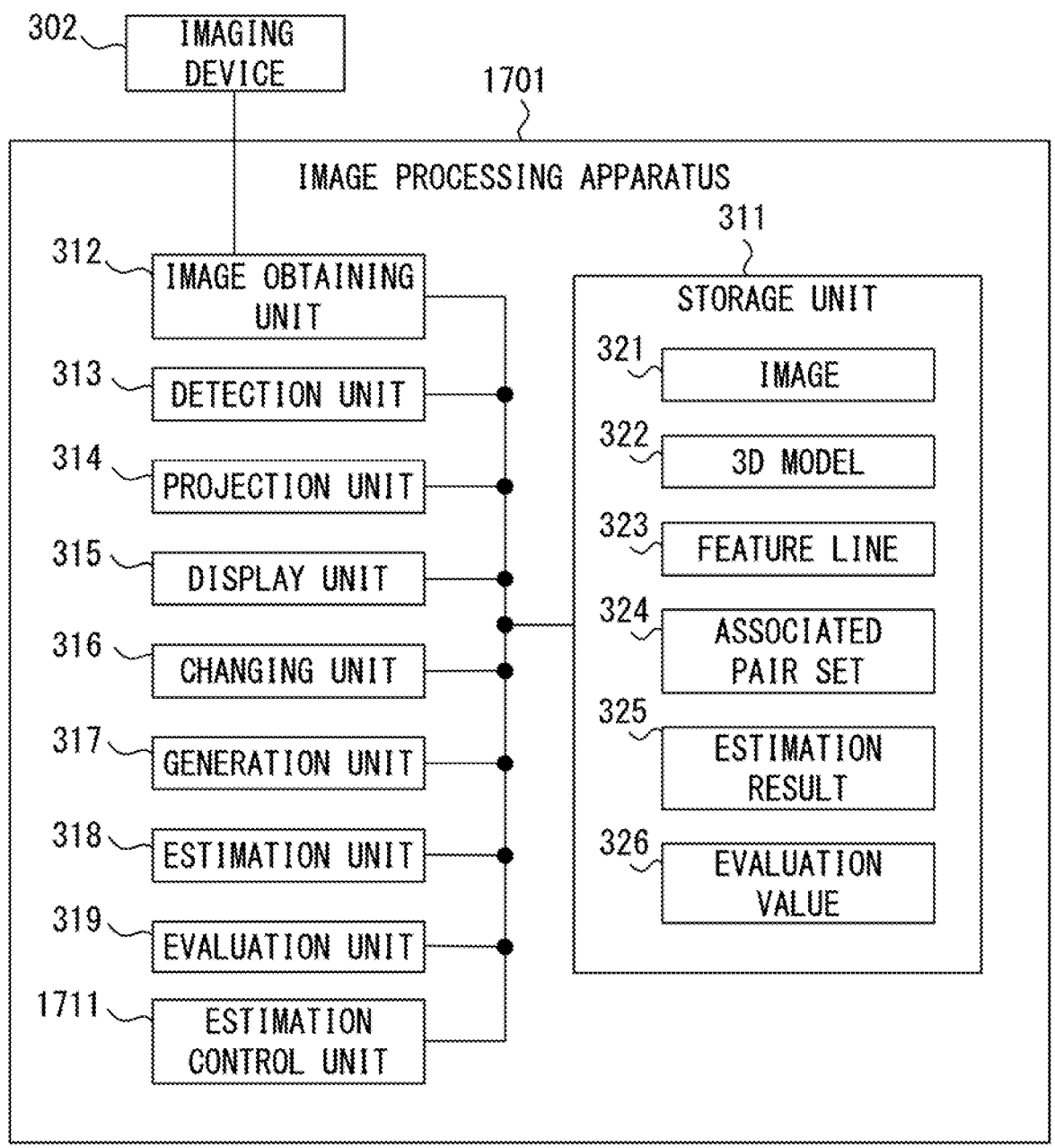
FIG. 17 is a diagram of a functional configuration illustrating a second specific example of the image processing apparatus.

FIG. 17 illustrates the second specific example of the image processing apparatus 101 in FIG. 1. An image processing apparatus 1701 in FIG. 17 has the configuration of the image processing apparatus 301 in FIG. 3 but an estimation control unit 1711 is added so as to restrain the operation of the estimation unit 318 in accordance with an explicit restraint instruction given by a user.

The estimation control unit 1711 restrains the operation of the estimation unit 318 estimating a position and an orientation of the imaging device 302 during a specific period of time in which the changing unit 316 changes the position or orientation of the 3D model 322. This restraint of the operation of the estimation unit 318 prevents generation of an erroneous estimation result 325 from an erroneously associated pair generated during the change operation performed by the user. This restraint can therefore prevent the processing from being ended when the position is at a shifted position that is not intended by the user.

For example, the estimation control unit 1711 restrains the operation of the estimation unit 318 when a restraint instruction is input by a user. For the restraint instruction, a key operation of pressing down a specific key such as a control key may be used. In this case, when the user carries out the change operation while pressing down the specific key, the operation of the estimation unit 318 can be restrained. In this manner, the user can explicitly restrain the operation of the estimation unit 318 at the desired timing.

Figure 18:
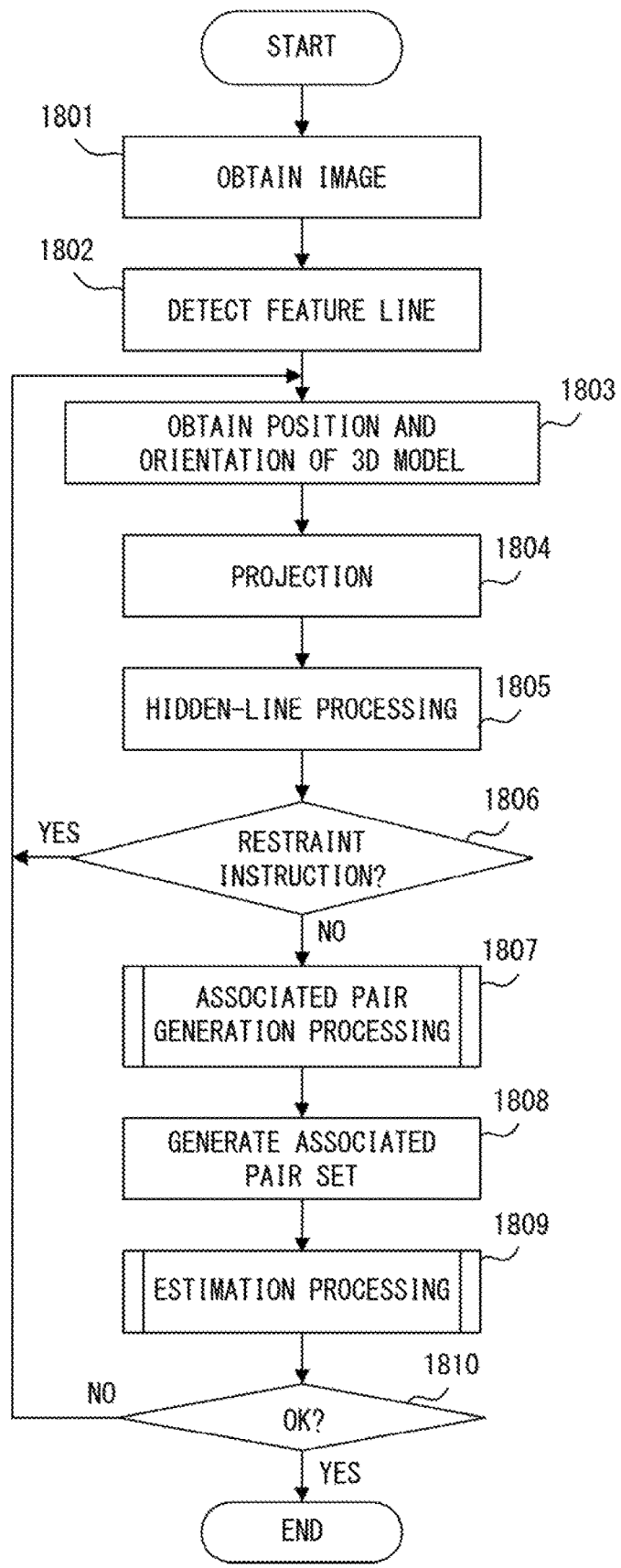
FIG. 18 is a flowchart of the third specific example of the image processing.

FIG. 18 is a flowchart of the third specific example of the image processing carried out by the image processing apparatus 1701 in FIG. 17. The processing in step 1801 to step 1805 and step 1807 to step 1810 is the same as the processing in step 1401 to step 1409 in FIG. 14.

After the projection unit 314 carries out hidden-line processing and the display unit 315 displays, on a screen, the image 321, the plural feature lines 323, and plural projection lines representing the 3D model 322, the estimation control unit 1711 checks whether an restraint instruction is input by a user or not (step 1806).

When a restraint instruction is input (step 1806, YES), the estimation control unit 1711 restrains the operation of the estimation unit 318, and the image processing apparatus 1701 repeats the processing in step 1803 and the subsequent processing. On the other hand, when a restraint instruction is not input (step 1806, NO), the estimation control unit 1711 releases the restraint of the estimation unit 318, and the image processing apparatus 1701 carries out the processing in step 1807 and the subsequent processing.

Figure 19:
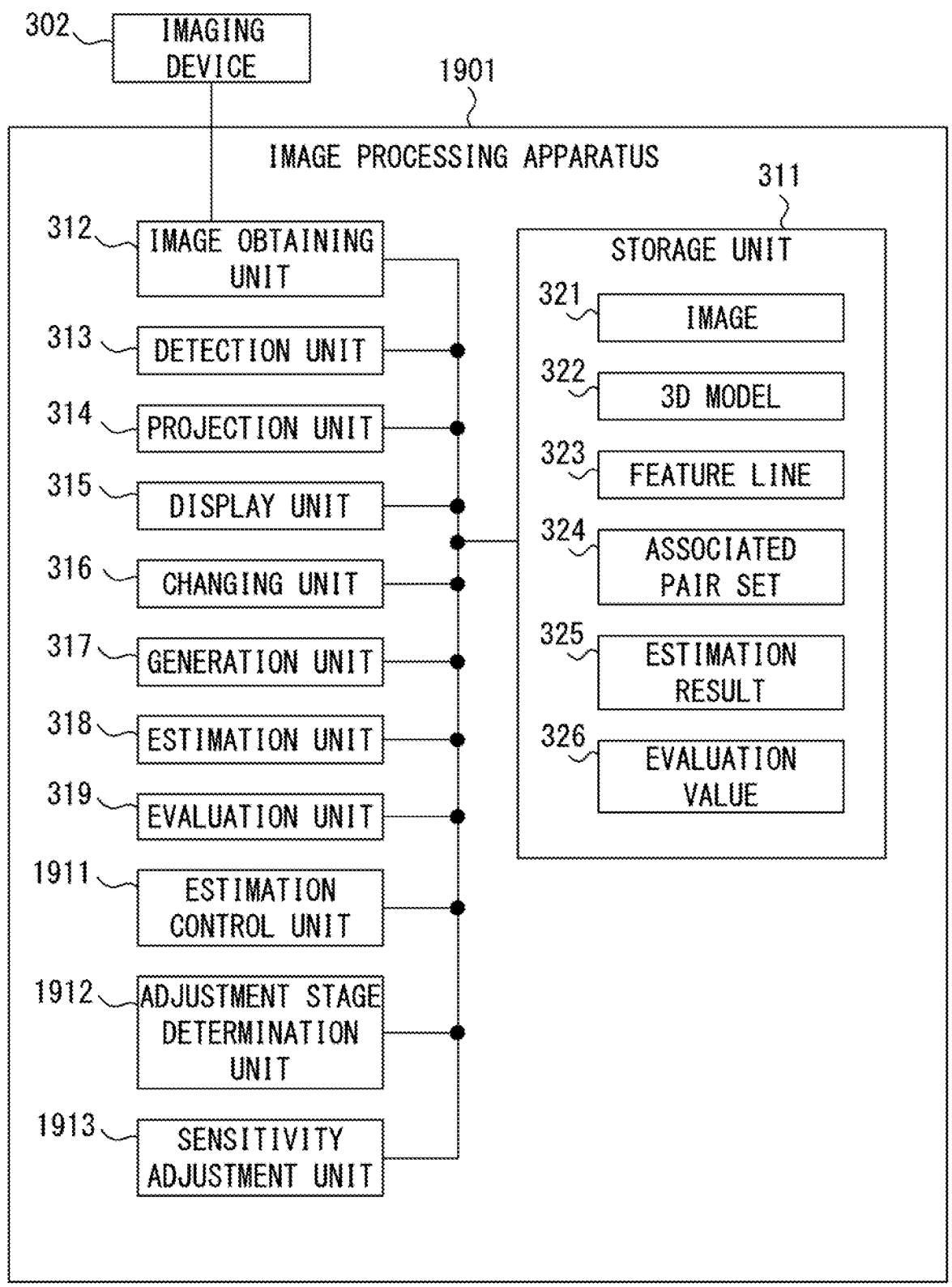
FIG. 19 is a diagram of a functional configuration illustrating a third specific example of the image processor apparatus.

FIG. 19 illustrates the third specific example of the image processor apparatus 101 in FIG. 1. The image processor apparatus 1901 in FIG. 19 has the configuration of the image processor apparatus 301 in FIG. 3 but an estimation control unit 1911, an adjustment stage determination unit 1912, and a sensitivity adjustment unit 1913 are added and automatically restrains the operation of the estimation unit 318.

The estimation control unit 1911 restrains the operation of the estimation unit 318 estimating a position and an orientation of the imaging device 302 during a specific period of time in which the changing unit 316 changes the position or orientation of the 3D model 322. This restraint of the operation of the estimation unit 318 prevents generation of an erroneous estimation result 325 from an erroneously associated pair generated during the change operation performed by the user. This restraint can therefore prevent the processing from being ended when the position is at a shifted position that is not intended by the user.

The adjustment stage determination unit 1912 determines whether rough adjustment or fine adjustment of the position or orientation of the 3D model 322 is carried out by the changing unit 316. When the changing unit 316 carries out rough adjustment, the estimation control unit 1911 restrains the operation of the estimation unit 318 and when the changing unit 316 carries out fine adjustment, the estimation control unit 1911 does not restrain the operation of the estimation unit 318. As a result, generation of an estimation result 325 is restrained while a user carries out a rough change operation and the estimation result 325 can be generated at a point in time at which the user starts a fine change operation.

The sensitivity adjustment unit 1913 lowers the change sensitivity G of a position or orientation of the 3D model 322 subjected to the change operation when the changing unit 316 carries out the fine adjustment than when the changing unit 316 carries out the rough adjustment.

For example, when a position of the camera coordinate system of the imaging device 302 is (X, Y, Z) in the three-dimensional space and a corresponding position is (x, y) on the screen, the coordinate X and the coordinate Y can be represented in accordance with the following equations.

$$X=(x-cx)*Z/f \quad (11)$$

$$Y=(y-cy)*Z/f \quad (12)$$

Z represents the coordinate in depth direction in the camera coordinate system, f represents a focal distance, and (cx, cy) represents a coordinate of the image center on the screen. Here, f and (cx, cy) are internal parameters of the imaging device 302.

In this case, a relation between an amount of operation LP of an operation pointer on the screen and an amount of movement LM of the 3D model 322 in the three-dimensional space can be represented in accordance with the following equation by using a coefficient of the amount of movement C and the change sensitivity G.

$$LM=LP*C*G \quad (13)$$

For the operation pointer, a mouse cursor etc. displayed on the screen can be used. The amount of operation LP represents an amount of movement (the number of pixels) of the operation pointer in the x direction or in the y direction, and the amount of movement LM represents an amount of movement of the 3D model 322 in the X direction or in the Y direction. When the coefficient of the amount of movement C is set to Z/f, the amount of operation LP and the amount of movement LM agree with each other when G=1.

For the amount of movement in the Z direction, with the use of a constant Q, the coefficient of the amount of movement C may be set to (Z/f)*Q. Then even when a distance in depth direction changes, the operation feeling of a user does not change. The constant Q can be determined by experiments.

During the rough adjustment of the 3D model 322, by setting the change sensitivity G to a larger value, a movement of the 3D model 322 can be made to a large extent by one change operation. After the fine adjustment is started, by changing the change sensitivity G to a smaller value, the 3D model 322 can be moved little by little.

Figure 20:
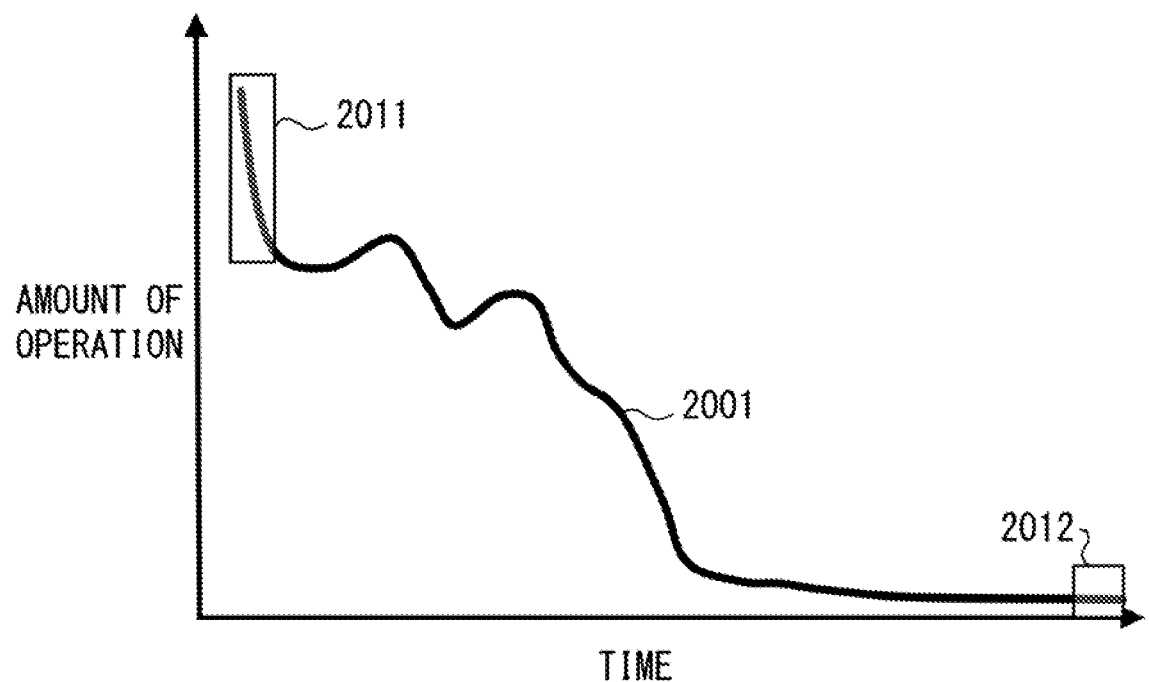
FIG. 20 is a diagram illustrating a change in the amount of operation over time.

FIG. 20 illustrates an example of a change in the amount of operation over time. In FIG. 20, time is on the horizontal axis and the amount of operation is on the vertical axis. A curve line 2001 represents a change in the amount of operation over time. A change in the amount of operation is large in a time period 2011 on the curve line 2001, and in this period, a change operation of the rough adjustment is carried out. On the other hand, a change in the amount of operation is small in a time period 2012 on the curve line 2001, and in this period, a change operation of the fine adjustment is carried out.

The sensitivity adjustment unit 1913 records the amount of operation in the change operation carried out by a user and adjusts the change sensitivity G based on a change in the amount of operation over time. For a method of adjusting the change sensitivity G, a possible method is provided below as an example.

(A) The sensitivity adjustment unit 1913 calculates a ratio of the amount of operation in a most recent specific period of time to the amount of operation in the specific period of time in the early stage of the operation or the amount of operation in the specific period of time before a defined time from the current time. The sensitivity adjustment unit 1913 make a change in the change sensitivity G in accordance with the calculated ratio.

(B) The sensitivity adjustment unit 1913 makes a change in the change sensitivity G in accordance with the amount of operation in a most recent specific period of time.

In FIG. 20, the time period 2011 corresponds to a specific period of time in the early stage of the operation and the time period 2012 corresponds to the most recent specific period of time.

Figure 21:
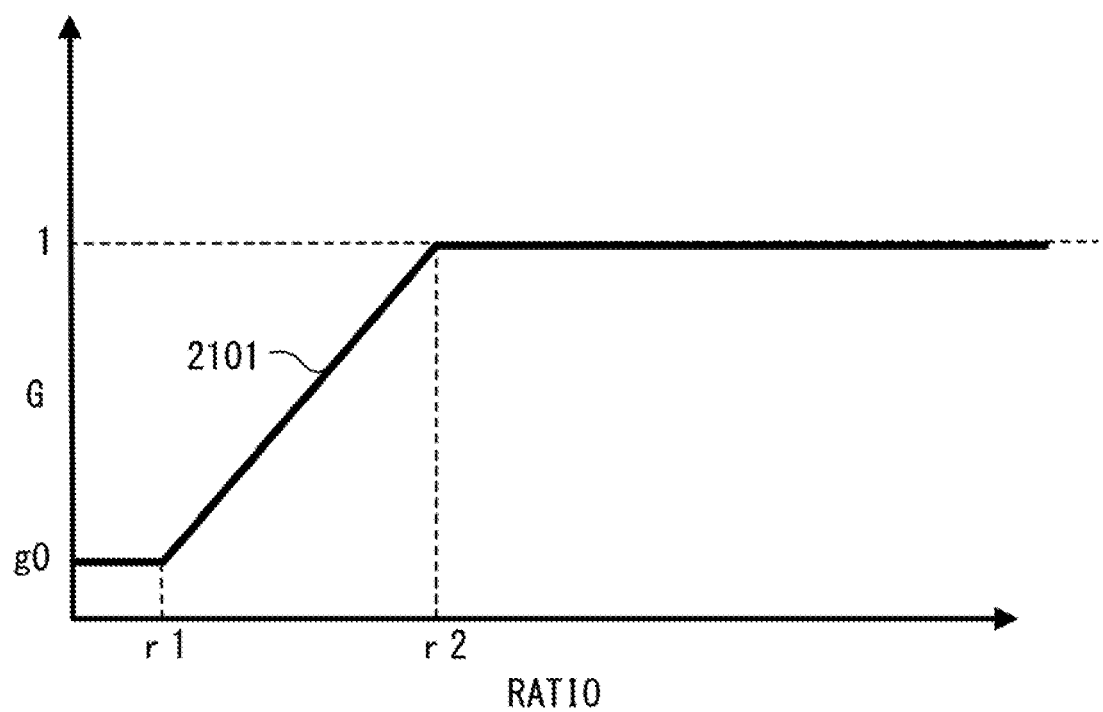
FIG. 21 is a diagram illustrating the first sensitivity adjustment method.

FIG. 21 illustrates the first sensitivity adjustment method. In FIG. 21, a ratio of the amount of operation within the most recent 1 second to the amount of operation within 1 second in the early stage of the operation is on the horizontal axis, and the change sensitivity G is on the vertical axis. A curve line 2101 represents values of the change sensitivity G in accordance with the ratio of the amount of operation.

When the ratio of the amount of operation is r1 or less, the change sensitivity G is g0, and when the ratio of the amount of operation is r2 or more, the change sensitivity G is 1. In a range where the ratio of the amount of operation is between r1 and r2, the change sensitivity G increases linearly from g0 to 1. As an example, g0 may be any value in a range from 0.1 to 0.3.

r1 and r2 may be a ratio obtained from the size of the image 321 or may be fixed values independent of the size of the image 321. An example may be r1=10% and r2=50%. Under the assumption that r1=r2, the change sensitivity G may be set to either g0 or 1.

FIG. 22 illustrates the second sensitivity adjustment method. In FIG. 22, a ratio of the amount of operation within the most recent 1 second to the amount of operation within 1 second in the early stage of the operation is on the horizontal axis and the change sensitivity G is on the vertical axis. A curve line 2201 represents values of the change sensitivity G in accordance with the ratio of the amount of operation. In this case, the change sensitivity G increases stepwise from g0 to 1 in a range where the ratio of the amount of operation is between r1 and r2. For the change sensitivity G in a range where the ratio of the amount of operation is between r1 and r2, another non-linear function such as the logarithmic function may be used.

Figure 23:
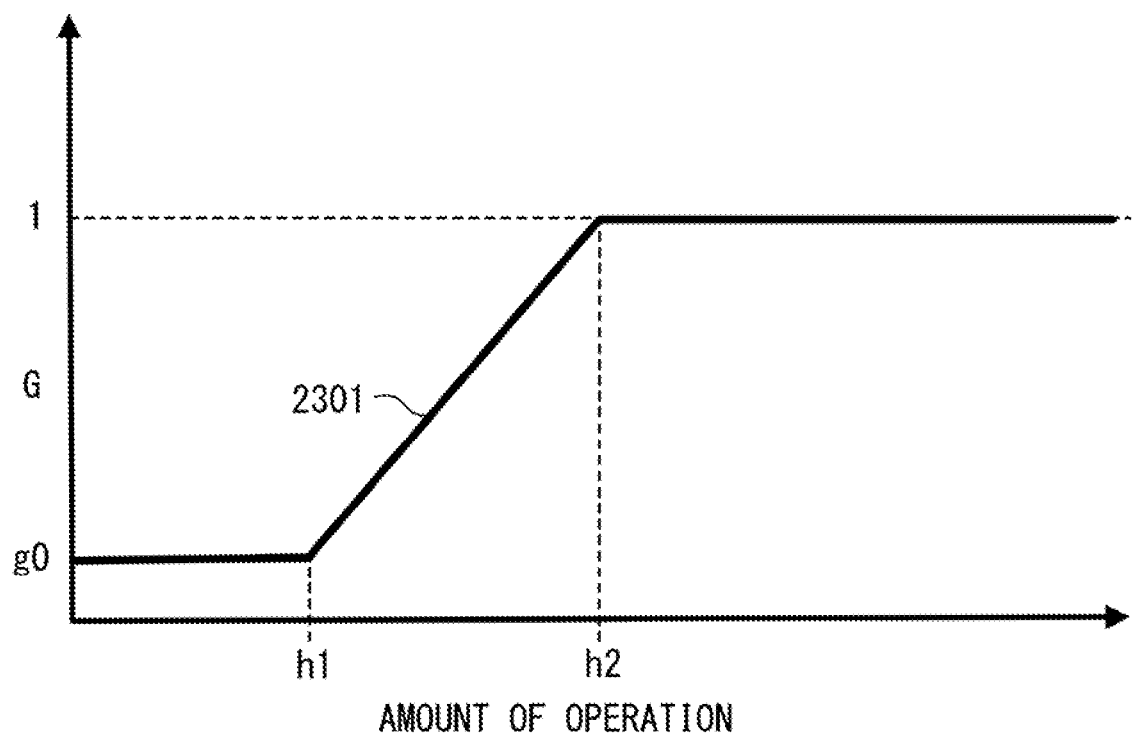
FIG. 23 is a diagram illustrating the third sensitivity adjustment method.

FIG. 23 illustrates the third sensitivity adjustment method. In FIG. 23, the amount of operation within the most recent 1 second is on the horizontal axis and the change sensitivity G is on the vertical axis. A curve line 2301 represents values of the change sensitivity G in accordance with the amount of operation.

When the amount of operation is h1 pixels or less, the change sensitivity G is g0 and when the amount of operation is h2 pixels or more, the change sensitivity G is 1. In a range where the amount of operation is between h1 and h2 pixels, the change sensitivity G increases linearly from g0 to 1.

h1 and h2 may be the number of pixels obtained from the size of the image 321 or may be fixed values independent of the size of the image 321. As an example, h1 may be 5% of the number of pixels of the width of the image 321 and h2 may be 10% of the number of pixels of the width of the image 321. Under the assumption that h1=h2, the change sensitivity G may be set to either g0 or 1.

FIG. 24 illustrates the fourth sensitivity adjustment method. In FIG. 24, the amount of operation within the most recent 1 second is on the horizontal axis and the change sensitivity G is on the vertical axis. A curve line 2401 represents values of the change sensitivity G in accordance with the amount of operation. In this case, the change sensitivity G increases stepwise from g0 to 1 in a range where the amount of operation is between h1 pixels and h2 pixels. For the change sensitivity G in a range where the amount of operation is between h1 pixels and h2 pixels, another non-linear function such as the logarithmic function may be used.

As illustrated in FIG. 21 to FIG. 24, by adjusting the change sensitivity G based on a change in the amount of operation over time, proper change sensitivity G can be set depending on whether the rough adjustment is carried out or the fine adjustment is carried out.

When a user carries out the change operation, the change sensitivity G can be displayed by changing a display mode of an operation pointer. In this case, the display unit 315 displays the operation pointer of the change operation on the screen and changes the display mode of the operation pointer in accordance with the change sensitivity G. This enables a user to visually recognize a change in the change sensitivity G. The change in the display mode can be changes in size, shape, color, or others.

Figure 25C:
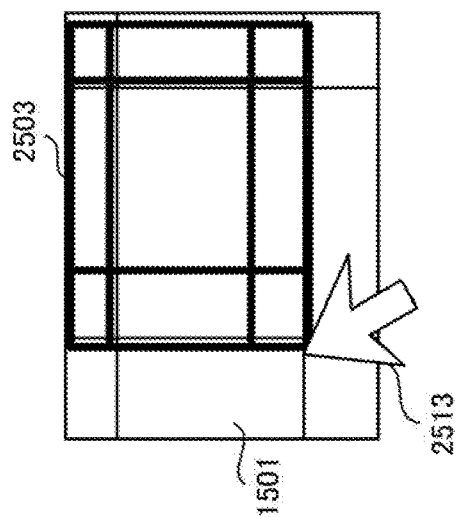
FIG. 25C is a diagram illustrating an operation pointer when a larger figure is superimposed on an area of the upper right portion of the image.
Figure 25B:
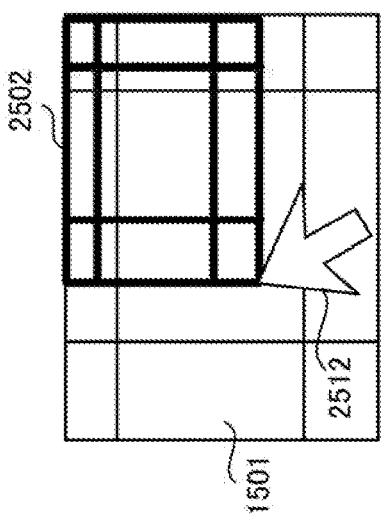
FIG. 25B is a diagram illustrating an operation pointer when a figure is superimposed on an area of the upper right portion of the image.
Figure 25A:
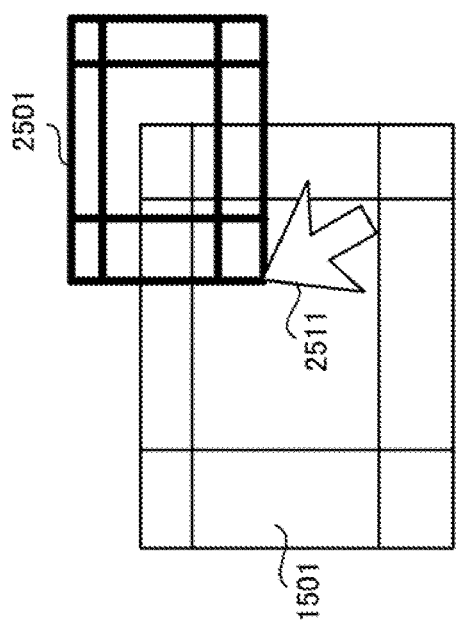
FIG. 25A is a diagram illustrating an operation pointer when a figure is displayed on a position that is shifted from an image in rough adjustment.

FIG. 25A to FIG. 25C illustrate examples of an operation pointer in the rough adjustment. A FIG. 2501 to a FIG. 2503 represent figures of the 3D model 322 projected on the image 1501.

FIG. 25A illustrates an operation pointer 2511 when the FIG. 2501 is displayed on a position that is shifted from the image 1501. FIG. 25B illustrates an operation pointer 2512 when the FIG. 2502 is superimposed on an area of the upper right portion of the image 1501. FIG. 25C illustrates an operation pointer 2513 when the FIG. 2503, which is larger than the FIG. 2502, is superimposed on the area of the upper right portion of the image 1501. The operation pointer 2511 to the operation pointer 2513 are displayed in the same size.

Figure 26:
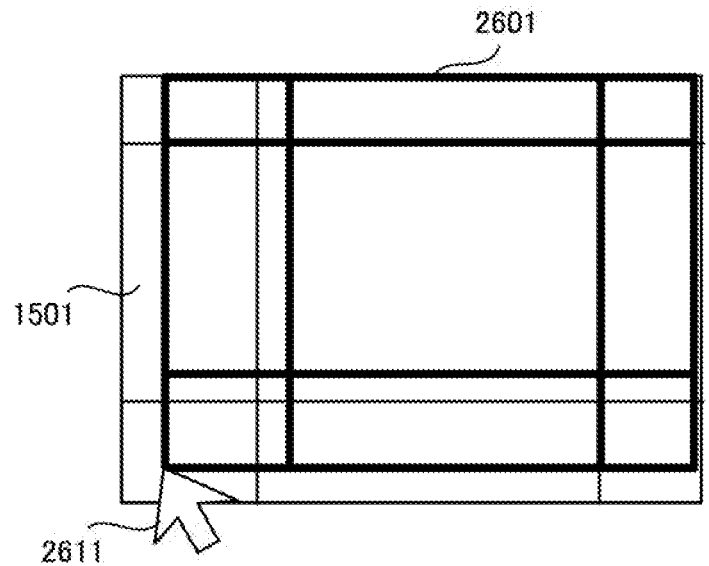
FIG. 26 is a diagram illustrating an operation pointer in fine adjustment.

FIG. 26 illustrates an example of an operation pointer in the fine adjustment. A FIG. 2601 represents a figure of the 3D model 322 projected on the image 1501. An operation pointer 2611 in the fine adjustment is displayed smaller in size than the operation pointer 2511 to the operation pointer 2513 in the rough adjustment.

When a change in size is used as the change in the display mode, the size of the operation pointer may be continuously changed in accordance with the change sensitivity G. Similarly, when a change in shape or color is used as the change in the display mode, the shape or the color of the operation pointer may be continuously changed in accordance with the change sensitivity G.

The changing unit 316 changes the position or orientation of the 3D model 322 in accordance with the change operation of a user, and the adjustment stage determination unit 1912 determines whether the changing unit 316 carries out the rough adjustment or the fine adjustment in accordance with the amount of operation in the change operation.

For example, the adjustment stage determination unit 1912 determines the adjustment that the changing unit 316 is carrying out to be the rough adjustment when the ratio of the amount of operation in the sensitivity adjustment method in (A) or the amount of operation in a most recent specific period of time in the sensitivity adjustment method in (B) is larger than a threshold. The adjustment stage determination unit 1921 determines the adjustment that the changing unit 316 is carrying out to be the fine adjustment when the ratio of the amount of operation or the amount of operation in the most recent specific period of time is equal to or less than a threshold.

When plural candidates of the position and the orientation of the imaging device 302 are generated by the estimation unit 318 as a result of the fine adjustment, the user can designate any one of the candidates. In this case, the display unit 315 superimposes and displays figures indicating the 3D model 322 corresponding to respective candidates on the image 321, and the user selects any one of the figures. The estimation unit 318 determines the position and the orientation of the imaging device 302 based on the figure selected by the user.

When plural candidates of the position and the orientation of the imaging device 302 are generated, the estimation unit 318 may identify any one candidate, and the user may change the identified candidate to another candidate. In this case, the display unit 315 superimposes and displays a figure indicating the 3D model 322 corresponding to the candidate identified by the estimation unit 318 on the image 321 and also displays candidate information indicating that plural candidates exist.

When a candidate change instruction is input by the user, the display unit 315 superimposes and displays figures indicating the 3D model 322 corresponding to respective candidates on the image 321, and the user selects any one of the figures. The estimation unit 318 determines the position and the orientation of the imaging device 302 based on the figure selected by the user.

Figure 27A:
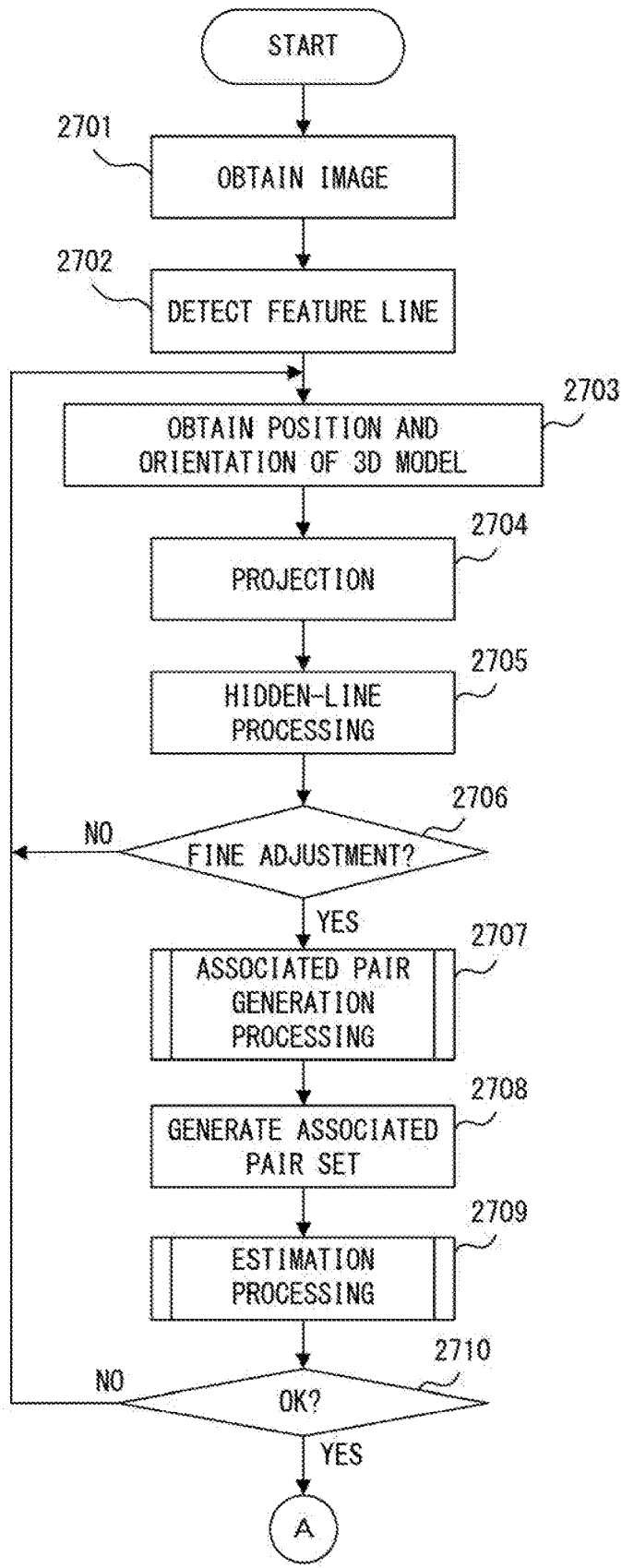
FIG. 27A is a flowchart (1) of the fourth specific example of the image processing.
Figure 27B:
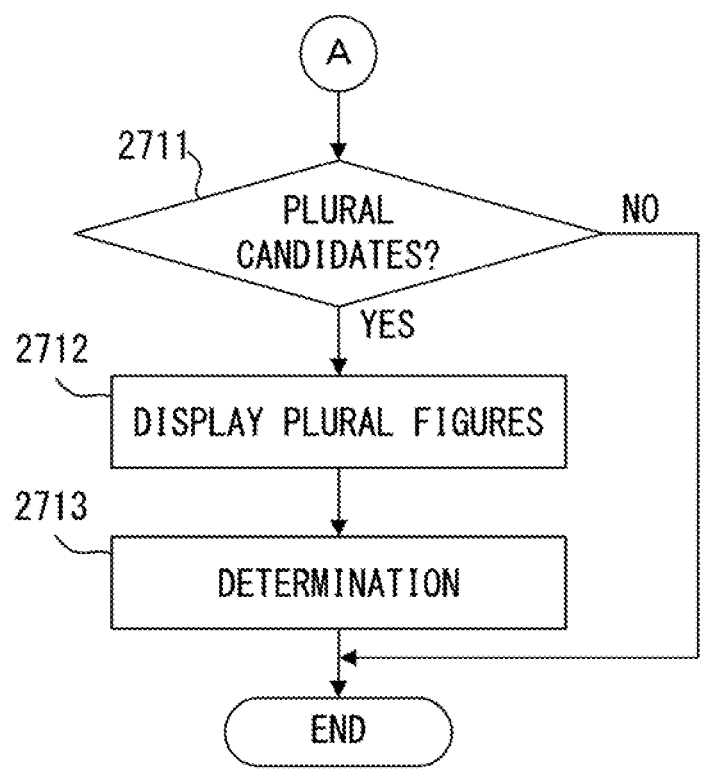
FIG. 27B is a flowchart (2) of the fourth specific example of the image processing.

FIG. 27A and FIG. 27B are flowcharts of the fourth specific example of the image processing carried out by the image processor apparatus 1901 in FIG. 19. In the image processing in FIG. 27A and FIG. 27B, a candidate of the position and the orientation of the imaging device 302 is designated by a user from among plural candidates. The processing in step 2701 to step 2705 and step 2707 to step 2710 is the same as the processing in step 1401 to step 1409 in FIG. 14.

However, the estimation processing in step 2709 is slightly different from the estimation processing in FIG. 12. In step 2709, the evaluation unit 319 calculates the sum S by selecting all the associated pair sets 324 in sequence and compares the calculated sum S with the threshold T2. When there is one associated pair set 324 or more associated pair sets 324 with the sum S being equal to or larger than the threshold T2, the evaluation unit 319 determines the estimation to be successful in step 2710.

When there is only one associated pair set 324 with the sum S being equal to or larger than the threshold T2, the estimation unit 318 determines the estimation result 325 obtained in accordance with the associated pair set 324 to be the position and the orientation of the imaging device 302. On the other hand, when there are plural associated pair sets 324 with the sun S being equal to or larger than the threshold T2, the estimation unit 318 determines the plural estimation results 325 obtained in accordance with those associated pair sets 324 to be plural candidates of the position and the orientation of the imaging device 302.

After the projection unit 314 carries out hidden-line processing and the display unit 315 displays, on a screen, the image 321, the plural feature lines 323, and plural projection lines representing the 3D model 322, the adjustment stage determination unit 1912 determines whether the changing unit 316 carries out the fine adjustment or not (step 2706).

When the changing unit 316 carries out the rough adjustment (step 2706, NO), the estimation control unit 1911 restrains the operation of the estimation unit 318, and the image processing apparatus 1901 repeats the processing in step 2703 and the subsequent processing. On the other hand, when the changing unit 316 carries out the fine adjustment (step 2706, YES), the estimation control unit 1911 releases the restraint of the estimation unit 318, and the image processing apparatus 1901 carries out the processing in step 2707 and the subsequent processing.

When the estimation was successful (step 2710, YES), the estimation unit 318 checks whether plural candidates were generated or not (step 2711). When plural candidates were generated (step 2711, YES), the display unit 315 superimposes and displays figures indicating the 3D model 322 corresponding to the respective candidates on the image 321 (step 2712).

Next, the estimation unit 318 determines the estimation result of the candidate corresponding to a figure selected by a user from among the plural figures to be the position and the orientation of the imaging device 302 (step 2713). The projection unit 314 projects plural line segments included in the 3D model 322 on the image 321 by using the determined position and the determined orientation of the imaging device 302, and the display unit 315 superimposes the 3D model 322 on the image 321.

On the other hand, when there is only one associated pair set 324 with the sum S being equal to or larger than the threshold T2 and the position and the orientation of the imaging device 302 have been already determined (step 2711, NO), the image processing apparatus 1901 ends the processing.

According to the image processing in FIG. 27A and FIG. 27B, the most suitable candidate can be designated by a user himself/herself from among plural candidates generated by the fine adjustment to determine the position and the orientation of the imaging device 302.

Figure 28:
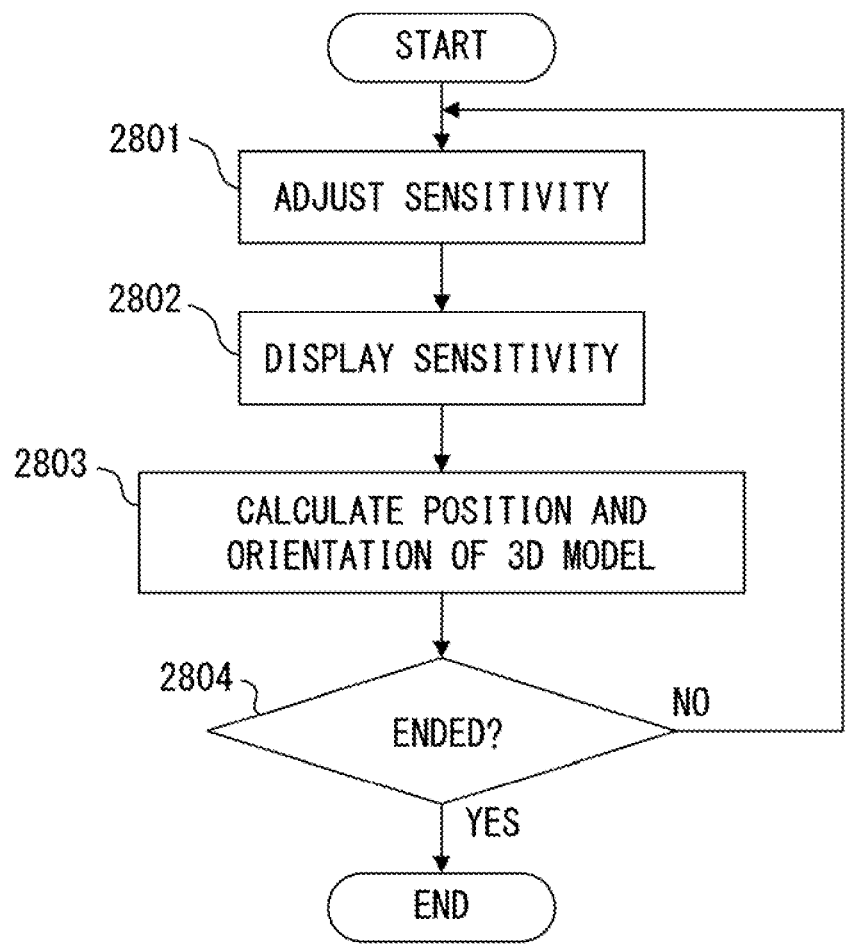
FIG. 28 is a flowchart of sensitivity adjustment processing.

FIG. 28 is a flowchart of sensitivity adjustment processing carried out by the image processing apparatus 1901 in FIG. 19. The sensitivity adjustment processing in FIG. 28 is executed independently of the image processing in FIG. 27A and FIG. 27B. The sensitivity adjustment unit 1913, first, adjusts the change sensitivity G based on the amount of operation in the change operation carried out by a user (step 2801). The display unit 315 displays the change sensitivity G by changing a display mode of an operation pointer in accordance with the adjustment change sensitivity G (step 2802).

Next, the changing unit 316 calculates a position and an orientation of the 3D model 322 (step 2803) by carrying out the same processing as the processing in step 1301 to step 1306 in FIG. 13, and the sensitivity adjustment unit 1913 determines whether the processing is to be ended or not (step 2804). When the image processing in FIG. 27A and FIG. 27B was ended, the sensitivity adjustment unit 1913 determines the processing to be ended and determines the processing not to be ended when the image processing has not yet ended.

When the sensitivity adjustment unit 1913 determines the processing not to be ended (step 2804, NO), the image processing apparatus 1901 repeats the processing in step 2801 and the subsequent processing. When the sensitivity adjustment unit 1913 determines the processing to be ended (step 2804, YES), the image processing apparatus 1901 ends the processing.

Figure 29A:
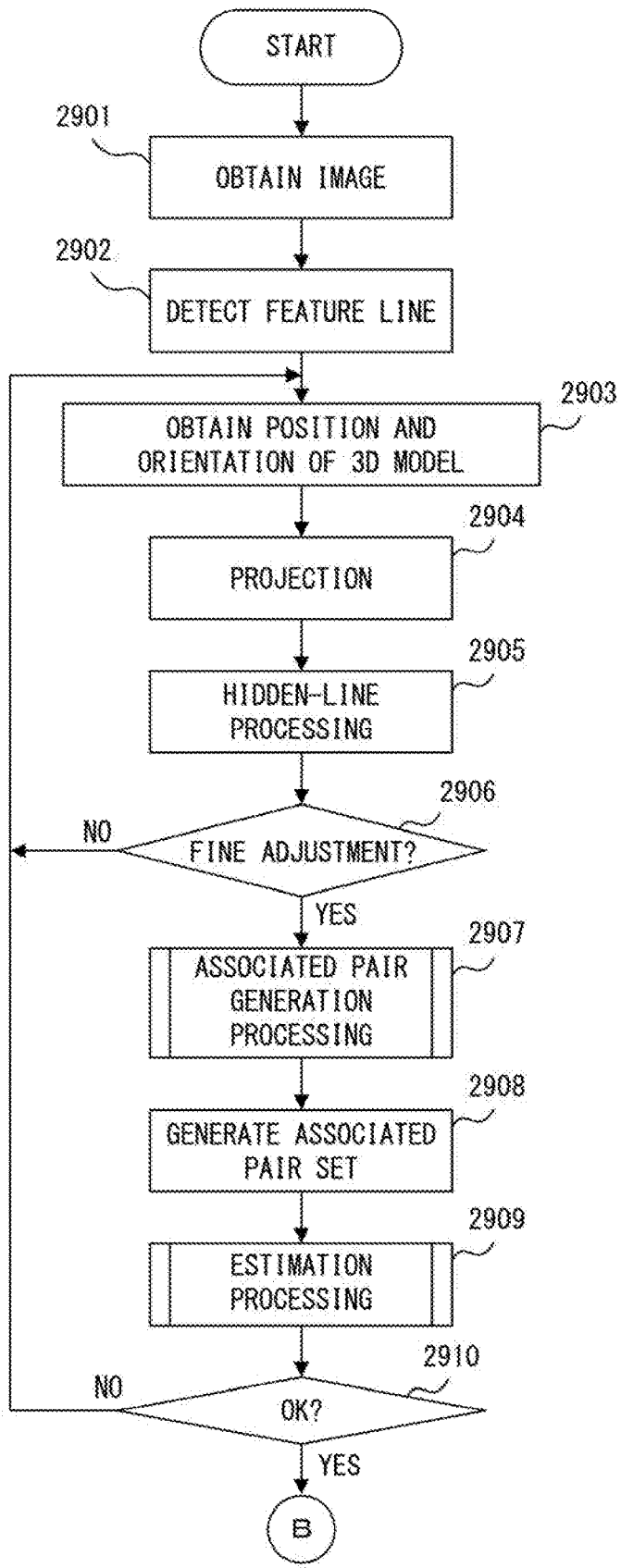
FIG. 29A is a flowchart (1) of the fifth specific example of the image processing.
Figure 29B:
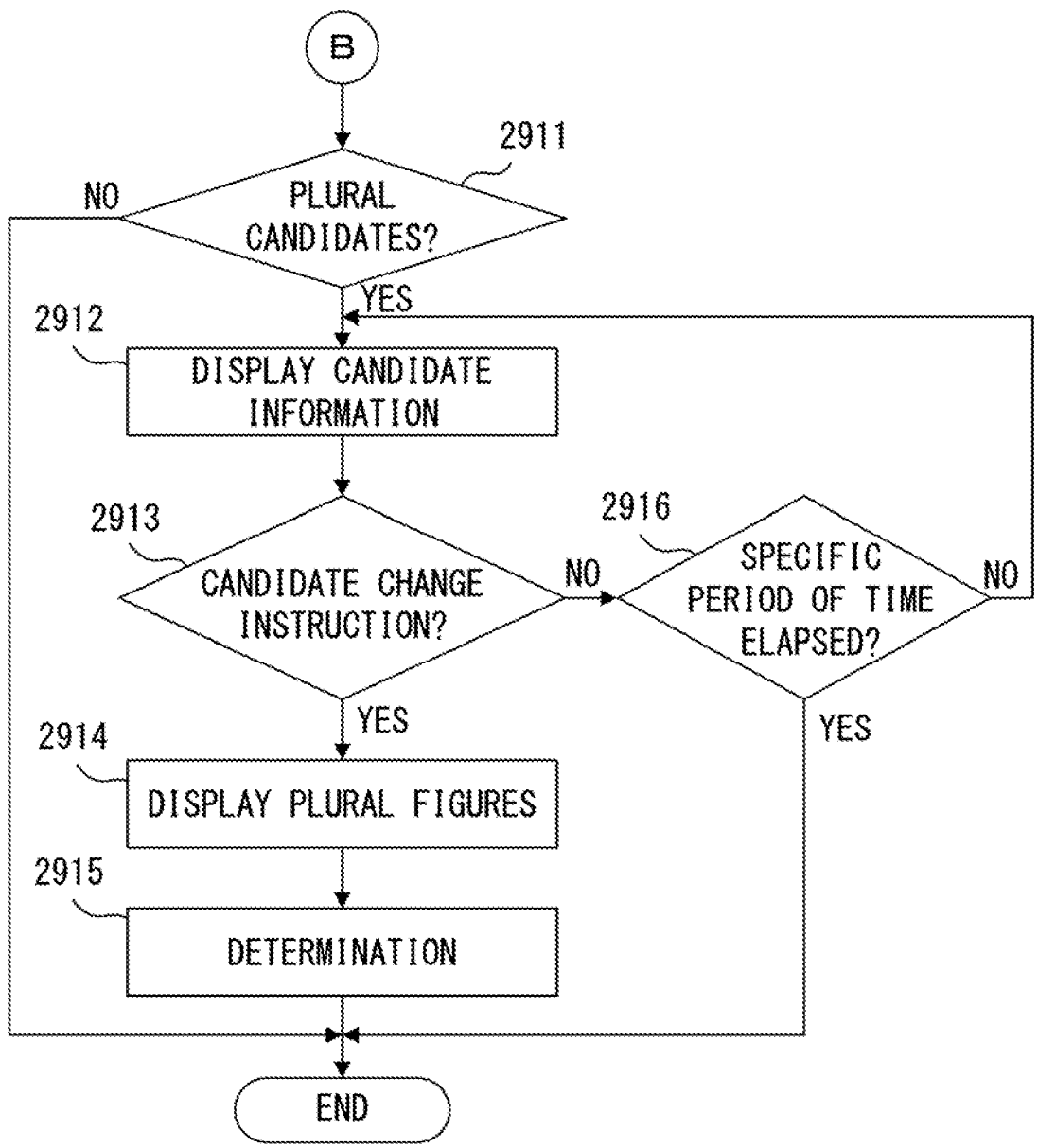
FIG. 29B is a flowchart (2) of the fifth specific example of the image processing.

FIG. 29A and FIG. 29B are flowcharts of the fifth specific example of the image processing carried out by the image processing apparatus 1901 in FIG. 19. In the image processing in FIG. 29A and FIG. 29B, any one candidate from among plural candidates of a position and an orientation of the imaging device 302 is identified by the estimation unit 318. The processing in step 2901 to step 2910 is the same as the processing in step 2701 to step 2710 in FIG. 27A.

When the estimation is successful (step 2910, YES), the estimation unit 318 checks whether plural candidates were generated or not (step 2911). When plural candidates were generated (step 2911, YES), the estimation unit 318 identifies a candidate corresponding to the associated pair set 324 that has the largest sum S from among the plural candidates.

The display unit 315 superimposes the figure indicating the 3D model 322 corresponding to the identified candidate on the image 321 and displays candidate information indicating that plural candidates exist and a change button (step 2912). By pressing the displayed change button, a user can input a candidate change instruction to the image processing apparatus 1901.

Next, the estimation unit 318 checks whether a candidate change instruction is input from a user or not (step 2913). When a candidate change instruction is input (step 2913, YES), the display unit 315 superimposes and displays figures indicating the 3D model 322 corresponding to respective candidates on the image 321 (step 2914).

Next, the estimation unit 318 determines the estimation result 325 of the candidate corresponding to the figure selected by the user from among the figures to be an position and an orientation of the imaging device 302. The projection unit 314 projects plural line segments included in the 3D model 322 on the image 321 by using the determined position and the determined orientation of the imaging device 302, and the display unit 315 superimposes the 3D model 322 on the image 321.

When there is only one associated pair set 324 with the sum S being equal to or larger than the threshold T2 and the position and the orientation of the imaging device 302 have been already determined (step 2911, NO), the image processing apparatus 1901 ends the processing.

When a candidate change instruction is not input (step 2913, NO), the estimation unit 318 checks whether a specific period of time has elapsed since the start of the display of the candidate information or not (step 2916). When the specific period of time has not elapsed (step 2916, NO), the image processing apparatus 1901 repeats the processing in step 2912 and the subsequent processing. When the specific period of time has elapsed (step 2916, YES), the image processing apparatus 1901 ends the processing.

According to the image processing in FIG. 29A and FIG. 29B, even when the position and the orientation of the imaging device 302 is tentatively determined in accordance with a candidate generated by the fine adjustment, as long as it is within a specific period of time, the user himself/herself can change the tentative candidate to another candidate.

Note that when the image processing in FIG. 29A and FIG. 29B is carried out, the sensitivity adjustment processing in FIG. 28 is independently executed.

The configurations of the image processing apparatuses in FIG. 1, FIG. 3, FIG. 17 and FIG. 19 are merely examples of configurations, and some components may be omitted or changed depending on the use or conditions of the image processing apparatuses. For example, in the image processing apparatus 301 in FIG. 3, when an external device carries out the processing of displaying the image 321 and the 3D model 322, the display unit 315 may be omitted.

When a user does not change a position or orientation of the 3D model 322, the changing unit 316 may be omitted. Instead of CAD data, other types of shape information representing a shape of an object may be used as a 3D model 322. The image 321 is not limited to an image obtained from the imaging device 302, but may be an image stored in the storage unit 311 in advance or may be an image obtained from an external device over a communication network.

In the image processing apparatus 1901 in FIG. 19, when the change sensitivity G does not need to be adjusted, the sensitivity adjustment unit 1913 can be omitted.

The flowcharts in FIG. 2, FIG. 10 to FIG. 14, FIG. 18 and FIG. 27A to FIG. 29B are merely examples, and some steps of the processing may be omitted or changed depending on the configuration or conditions of the image processing apparatus. For example, in the associated pair generation processing in FIG. 11, any of the filtering in steps 1102 to 1104 may be omitted. When a user does not change a position or orientation of the 3D model 322, the changing processing in FIG. 13 may be omitted.

The 3D model, the projection lines, and the feature lines illustrated in FIG. 4, FIG. 7, FIG. 8A and FIG. 8B are merely examples, and the 3D model, the projection lines, and the feature lines change depending on an object to be imaged. Orientations of the 3D model illustrated in FIG. 8A and FIG. 8B are merely examples, and orientations of the 3D model change depending on the amount of rotation designated by a change instruction. The moving operation illustrated in FIG. 9 is merely an example, and a user may input a moving vector in other methods.

Images and figures illustrated in FIG. 15A to FIG. 15C, FIG. 16, FIG. 25A to FIG. 25C and FIG. 26 are merely examples, and images and figures change depending on an object to be imaged. The amount of operation in FIG. 20 is merely an example, and the amount of operation changes depending on the change operation of a user. The sensitivity adjustment methods in FIG. 21 to FIG. 24 are merely examples, and other sensitivity adjustment methods may be used depending on the configuration or conditions of the image processing apparatus.

The calculating equations of the equations (1) to (13) are merely examples, and other calculating equations may be used depending on the configuration or conditions of the image processing apparatus.

Figure 30:
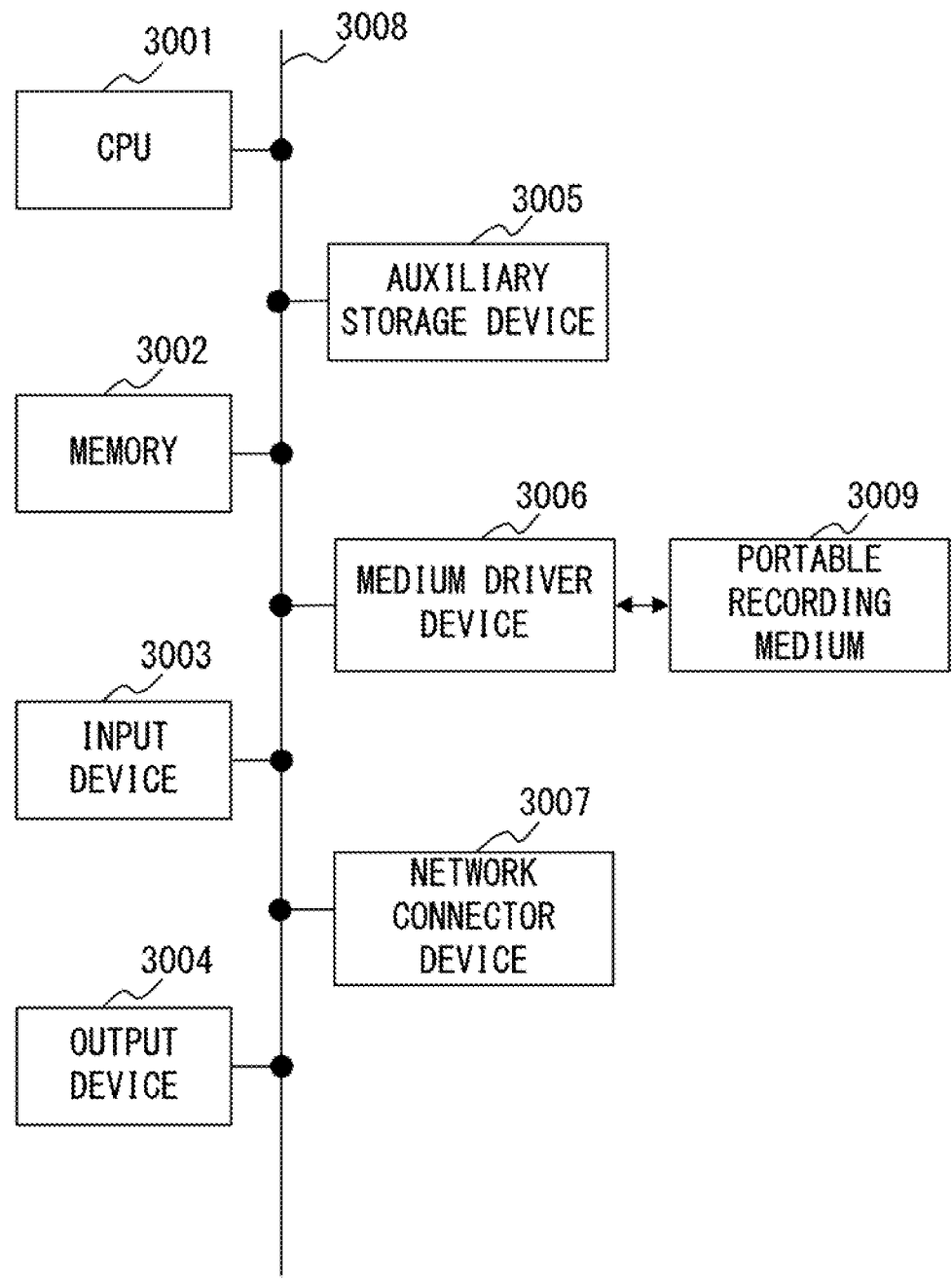
FIG. 30 is a diagram of a hardware configuration of an information processing apparatus.

FIG. 30 illustrates an example of the hardware configuration of an information processing apparatus (computer) used as the image processing apparatuses in FIG. 1, FIG. 3, FIG. 17 and FIG. 19. The information processing apparatus in FIG. 30 includes a central processing unit (CPU) 3001, a memory 3002, an input device 3003, an output device 3004, an auxiliary storage device 3005, a medium driver device 3006, and a network connector device 3007. These components are hardware and coupled to each other by a bus 3008. The imaging device 302 in FIG. 3, FIG. 17, and FIG. 19 may be coupled to the bus 3008.

The memory 3002 is, for example, a semiconductor memory such as a read only memory (ROM), a random access memory (RAM), and a flash memory and stores programs and data used for processing. The memory 3002 can be used as a storage unit 111 in FIG. 1 or a storage unit 311 in FIG. 3, FIG. 17 and FIG. 19.

CPU (processor) 3001 operates, for example, as the detection unit 112, the projection unit 113, the generation unit 114, the estimation unit 115, and the evaluation unit 116 in FIG. 1 by executing programs using the memory 3002. CPU 3001 also operates as the image obtaining unit 312, the detection unit 313, the projection unit 314, the changing unit 316, the generation unit 317, the estimation unit 318, and the evaluation unit 319 in FIG. 3, FIG. 17 and FIG. 19 by executing programs using the memory 3002.

CPU 3001 also operates as the estimation control unit 1711 in FIG. 17 by executing programs using the memory 3002. CPU 3001 also operates as the estimation control unit 1911, the adjustment stage determination unit 1912, and the sensitivity adjustment unit 1913 in FIG. 19 by executing programs using the memory 3002.

The input device 3003 is, for example, a keyboard, a pointing device and the like and is used for inputting instructions or data from an operator or a user. The output device 3004 is, for example, a display device, a printer, a speaker, and the like and is used for outputting inquiries Or instructions to the operator or the user and for outputting processing results. The processing results may be an estimation result 325 or may be a 3D model 322 superimposed on an image 321. The output device 3004 may be used as the display unit 315 in FIG. 3, FIG. 17, and FIG. 19.

The auxiliary storage device 3005 is, for example, a magnetic disk device, an optical disk device, a magneto optical disk device, a tape device, and the like. The auxiliary storage device 3005 may be a hard disk drive or a flash memory. The information processing apparatus can store programs and data in the auxiliary storage device 3005 and loads them into the memory 3002 at the point of use. The auxiliary storage device 3005 may be used as the storage unit 111 in FIG. 1 or the storage unit 311 in FIG. 3, FIG. 17 and FIG. 19.

The medium driver device 3006 drives a portable recording medium 3009 and accesses to the recorded contents. The portable recording medium 3009 is a memory device, a flexible disk, an optical disk, a magneto optical disk, and the like. The portable recording medium 3009 may be a compact disk read only memory (CD-ROM), a digital versatile disk (DVD), a universal serial bus (USB) memory, and the like. The operator or the user can store programs and data in the portable recording medium 3009 and can load them into the memory 3002 at the time of use.

As described above, a computer-readable recording medium that stores programs and data used for processing such as the memory 3002, the auxiliary storage device 3005, or the portable recording medium 3009 is a physical (non-transitory) recording medium.

The network connector device 3007 is a communication interface circuit that is coupled to a communication network such as a local area network (LAN), a wide area network (WAN) and the like and that allows data exchange for communications. The information processing apparatus can receive programs and data from an external device via the network connector device 3007 and can load them into the memory 3002 at the time of use.

Note that the information processing apparatus does not need to include all of the components in FIG. 30, but some components may be omitted depending on the use or conditions. For example, when the portable recording medium 3009 or a communication network is not used, the medium driver device 3006 or the network connector device 3007, respectively, can be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing apparatus, comprising:
   a memory configured to store shape information including a plurality of line segments that represent a shape of an object; and
   a processor coupled to the memory, the processor configured to:
      detect a plurality of feature lines from an obtained image of the object;
      generate a plurality of projection lines by projecting the plurality of line segments on the image;
      generate combinations each including a feature line and a projection line by selecting the feature line from among the plurality of feature lines, by selecting the projection line from among the plurality of projection lines, and by associating the selected feature line with the selected projection line;
      generate a plurality of sets, each including a specific number of the combinations;
      estimate a position and an orientation in a three-dimensional space of an imaging device that has captured the image of the object by using each of the plurality of sets; and
      evaluate an estimation result of the position and the orientation of the imaging device for each of the plurality of sets,
   wherein when there is a change in a relative position or orientation between the object on the image captured by the imaging device and the shape represented by the shape information, the processor is configured to repeat generation of the plurality of sets, repeat estimation of the position and the orientation of the imaging device, repeat evaluation of the estimation result, and determine the position and the orientation of the imaging device based on a result of the repeated evaluation of the estimation result.

2. The image processing apparatus according to claim 1, wherein
   the image of the object is an object image captured by the imaging device.

3. The image processing apparatus according to claim 1, wherein
   the relative position or orientation between the object on the image captured by the imaging device and the shape represented by the shape information is changed by the processor changing a position or orientation of the shape represented by the shape information on the image captured by the imaging device.

4. The image processing apparatus according to claim 3, wherein
   the processor changes the position or orientation of the shape represented by the shape information by rotating the shape represented by the shape information around an axis of rotation by using a line segment selected from the plurality of line segments included in the shape information or a normal line of a plane including the line segment selected from the plurality of line segments and a viewpoint for the plurality of line segments as the axis of rotation.

5. The image processing apparatus according to claim 3, wherein
   the processor restrains an operation of estimating the position and the orientation of the imaging device in a specific period of time when the position or orientation of the shape represented by the shape information is changed.

6. The image processing apparatus according to claim 5, wherein
the processor restrains the operation of estimating the position and the orientation of the imaging device when a restraint instruction is input.

7. The image processing apparatus according to claim 5, wherein
the processor determines whether rough adjustment or fine adjustment of the position or orientation of the shape represented by the shape information is carried out, restrains the operation of estimating the position and the orientation of the imaging device when the rough adjustment is carried out, and does not restrain the operation of estimating the position and the orientation of the imaging device when the fine adjustment is carried out.

8. The image processing apparatus according to claim 7, wherein
the processor changes the position or orientation of the shape represented by the shape information based on a change operation in which a user changes the position or orientation of the shape represented by the shape information on the image captured by the imaging device and determines whether the rough adjustment or the fine adjustment is carried out in accordance with an amount of operation in the change operation,
the image processing apparatus further comprises a display device configured to superimpose and display, on the image captured by the imaging device, shapes of the object corresponding to each of a plurality of candidates for the position and the orientation of the imaging device when the processor carries out the fine adjustment and generates the plurality of candidates, and
the processor determines the position and the orientation of the imaging device based on a shape selected by the user from among the shapes of the object corresponding to each of the plurality of candidates.

9. The image processing apparatus according to claim 8, wherein
the processor lowers change sensitivity of the position or the orientation of the shape represented by the shape information subjected to the change operation when the processor carries out the fine adjustment than the change sensitivity when the processor carries out the rough adjustment.

10. The image processing apparatus according to claim 9, wherein
the processor adjusts the change sensitivity based on a change in the amount of operation in the change operation over time.

11. The image processing apparatus according to claim 9, wherein
the display device displays an operation pointer of the change operation and changes a display mode of the operation pointer in accordance with the change sensitivity.

12. The image processing apparatus according to claim 7, wherein
the processor changes the position or orientation of the shape represented by the shape information based on a change operation in which a user changes the position or orientation of the shape represented by the shape information on the image captured by the imaging device and determines whether the rough adjustment or the fine adjustment is carried out in accordance with an amount of operation in the change operation,
the image processing apparatus further comprises a display device configured to superimpose and display, on the image captured by the imaging device, a shape of the object corresponding to one of a plurality of candidates for the position and the orientation of the imaging device when the processor carries out the fine adjustment and generates the plurality of candidates,
the display device superimposes and displays, on the image captured by the imaging device, the shapes of the object corresponding to each of the plurality of candidates when a candidate change instruction is input, and
the processor determines the position and the orientation of the imaging device based on a shape selected by the user from among the shapes of the object corresponding to each of the plurality of candidates.

13. The image processing apparatus according to claim 1, wherein
the relative position or orientation between the object on the image captured by the imaging device and the shape represented by the shape information is changed by the imaging device repeating image capture of the object after a relative position or orientation between the object and the imaging device is changed.

14. The image processing apparatus according to claim 1, wherein
the processor selects a set from the plurality of sets as a set for evaluation, generates a projection line for evaluation by reprojecting on the image a line corresponding to a projection line included in each combination of the plurality of sets by using an estimation result of a position and an orientation of the imaging device estimated in accordance with the set for evaluation, calculates an error between a feature line included in each combination of the plurality of sets and the projection line for evaluation, determines an evaluation value that becomes smaller as a calculated error becomes larger, and compares a sum of evaluation values for all combinations included in the plurality of sets with a threshold, and
when the sum of evaluation values is less than the threshold for every sets selected, and the relative position or orientation between the object on the image captured by the imaging device and the shape represented by the shape information is changed, the processor repeats generation of the plurality of sets, repeats estimation of the position and the orientation of the imaging device, repeats evaluation of the estimation result, identifies a set for evaluation that has the sum of evaluation values larger than the threshold in a result of repeated evaluation of the estimation result, and determines the position and the orientation estimated in accordance with an identified set for evaluation to be the position and the orientation of the imaging device.

15. An image processing method, comprising
detecting, by a processor, a plurality of feature lines from an obtained image of an object;
generating, by the processor, a plurality of projection lines by projecting on the image a plurality of line segments included in shape information representing a shape of the object;
generating, by the processor, combinations each including a feature line and a projection line by selecting the feature line from among the plurality of feature lines, by selecting the projection line from among the plurality of projection lines, and by associating the selected feature line with the selected projection line;

generating, by the processor, a plurality of sets, each including a specific number of the combinations;

estimating, by the processor, a position and an orientation in a three-dimensional space of an imaging device that has captured the image of the object by using each of the plurality of sets;

evaluating, by the processor, an estimation result of the position and the orientation of the imaging device for each of the plurality of sets; and when there is a change in a relative position or orientation between the object on the image captured by the imaging device and the shape represented by the shape information, by the processor, repeating generation of the plurality of sets, repeating estimation of the position and the orientation of the imaging device, repeating evaluation of the estimation result, and determining the position and the orientation of the imaging device based on a result of the repeated evaluation of the estimation result.

16. The image processing method according to claim 15, wherein
the image of the object is an object image captured by the imaging device.

17. The image processing method according to claim 15, further comprising
changing the relative position or orientation between the object on the image captured by the imaging device and the shape represented by the shape information by changing a position or orientation of the shape represented by the shape information on the image captured by the imaging device.

18. A non-transitory computer-readable recording medium having stored therein an image processing program that causes a computer to execute a process comprising:

detecting a plurality of feature lines from an obtained image of an object;

generating a plurality of projection lines by projecting on the image a plurality of line segments included in shape information representing a shape of the object;

generating combinations each including a feature line and a projection line by selecting the feature line from among the plurality of feature lines, by selecting the projection line from among the plurality of projection lines, and by associating the selected feature line with the selected projection line;

generating a plurality of sets, each including a specific number of the combinations;

estimating a position and an orientation in a three-dimensional space of an imaging device that has captured the image of the object by using each of the plurality of sets;

evaluating an estimation result of the position and the orientation of the imaging device for each of the plurality of sets; and when there is a change in a relative position or orientation between the object on the image captured by the imaging device and the shape represented by the shape information, repeating generation of the plurality of sets, repeating estimation of the position and the orientation of the imaging device, repeating evaluation of the estimation result, and determining the position and the orientation of the imaging device based on a result of the repeated evaluation of the estimation result.

19. The non-transitory computer-readable recording medium according to claim 18, wherein
the image of the object is an object image captured by the imaging device.

20. The non-transitory computer-readable recording medium according to claim 18, wherein
the process further comprises changing the relative position or orientation between the object on the image captured by the imaging device and the shape represented by the shape information by changing a position or orientation of the shape represented by the shape information on the image captured by the imaging device.

* * * * *